United States Patent [19]

Nakagawa et al.

[11] Patent Number: 4,724,476
[45] Date of Patent: Feb. 9, 1988

[54] CHROMINANCE SIGNAL PROCESSING APPARATUS

[75] Inventors: Yukio Nakagawa, Moriguchi; Tokikazu Matsumoto, Osaka; Masao Tomita, Neyagawa, all of Japan

[73] Assignee: Matsushita Electric Industrial Co., Ltd., Osaka, Japan

[21] Appl. No.: 785,204

[22] Filed: Oct. 7, 1985

[30] Foreign Application Priority Data

Oct. 12, 1984 [JP] Japan ................. 59-214537
Oct. 12, 1984 [JP] Japan ................. 59-214538
Oct. 15, 1984 [JP] Japan ................. 59-215418
Oct. 15, 1984 [JP] Japan ................. 59-215419

[51] Int. Cl.$^4$ ............................................. H04N 9/83
[52] U.S. Cl. ............................ 358/11; 358/19; 358/310; 358/317
[58] Field of Search ........... 358/316, 317, 310, 315, 358/330, 11, 19

[56] References Cited

U.S. PATENT DOCUMENTS

| | | | |
|---|---|---|---|
| 3,947,871 | 3/1976 | Amari et al. | 358/317 |
| 4,007,485 | 2/1977 | Sato | 358/316 |
| 4,396,953 | 8/1983 | Fujita et al. | 358/316 |
| 4,417,284 | 11/1983 | Sato | 358/316 |
| 4,430,674 | 2/1984 | Taguchi et al. | 358/317 |

Primary Examiner—Donald McElheny, Jr.
Attorney, Agent, or Firm—Wenderoth, Lind & Ponack

[57] ABSTRACT

A chrominance signal processing apparatus for converting an input carrier chrominance signal received in a first operation mode to an output low-band converted chrominal signal, and for converting an input low-band converted chrominance signal received in a second operation mode to an output carrier chrominance signal includes a frequency converting circuit which performs these conversions in the respective first and second operation modes. A carrier chrominance signal carrier and a low-band converted chrominance signal carrier, both for use in the frequency converting circuit, are respectively generated by the first and second carrier generating circuits. In each of the first and second operation modes, one of the first and second carrier generating circuits is controlled to compensate for a phase error of each of the input signals. A phase error detecting circuit detects the phase error from the burst signals extracted from the output and respectively input low-band converted chrominance signals in the first and second operation modes to produce a control voltage signal for controlling the first or second carrier generating circuit. Control signals for the ACC and color killer circuit are also produced from the abovenoted burst signals.

7 Claims, 15 Drawing Figures

CHROMINANCE SIGNAL PROCESSING APPARATUS

BACKGROUND OF THE INVENTION

1. Field of the Invention

The present invention relates to a chrominance signal processing apparatus for recording and reproducing chrominance signals of the color television signals in a color video tape recorder (color VTR). The chrominance signal processing apparatus carries out frequency conversion of a low band converted chrominance signal or carrier chrominance signal, jitter correction of the carrier-frequency, signal level correction, black-and-white signal discrimination of input video signal and prohibition of the chrominance signal during recording and reproduction.

2. Description of the Prior Art

Conventional commercial color VTRs employ a recording system called a "color under" system in which the carrier chrominance signal which is converted to a low-band signal is recorded on a video tape under an FM luminance signal band by means of frequency multiplex system. The FM luminance signal is demodulated during playback, while the low-band converted original chrominance signal of the high color subcarrier frequency. The thus obtained two signals are added so as to thereby obtain a reproduced color television signal. Various circuit systems are conventionally proposed for integrating the circuits used in the chrominance signal processing apparatus. (e.g. I. Nakagawa, A. Shibata, and N. Horie, "New chrominance signal processing LSI," IEEE Transactions on Consumer Electronics, Vol. 26, No. 3, pp. 315-322, 1980). A typical configuration example of the conventional chrominance signal processing apparatus is shown in FIG. 1 and will hereafter be explained.

In FIG. 1, the carrier chrominance signal of a carrier-frequency f sc (3.58 M Hz in the case of an NTSC system) is fed from the terminal 1 during recording, and adjusted to an adequate level by an ACC amplifier (ACC) 2 and supplied to one input of the frequency converter 3. To the other input of the frequency modulator 3 is fed the carrier of a frequency f sc+f c which is the sum of the low-band converted carrier frequency fc (629 K Hz in the case of a VTR of a VHS system) and the carrier-frequency f sc of the carrier chrominance signal.

The level adjusted carrier chrominance signal and the carrier of the frequency f sc+f c are multipliid by the frequency converter 3. The low-band converted chrominance signal of the carrier-frequency fc obtained as a result of the multiplication is extracted by the lowpass filter (LPF) 4, and supplied to the killer switch (KILLER SW) 7 through the recording/reproducing output switch 6. The control terminal of the killer switch 7 is supplied with the discriminating results of the presence of the chrominance signal, by which the low-band converted chrominance signal from the switch 6 is switched so as to be supplied to the output terminal 8.

During playback, the low-band converted chrominance signal of the carrier-frequency fc is fed from the terminal 1 to be level adjusted by ACC amplifier 2 and supplied to one input of the frequency converter 3. To the other input of the frequency converter 3 is supplied the carrier of the frequency of f sc+fc which is the sum of the carrier-frequency fc of the low-band converter chrominance signal from the terminal 1 and the reference color subcarrier frequency f sc for reproduced carrier chrominance signal. The level adjusted low-band converted chrominance signal and the carrier of frequency f sc+fc are multiplied by the frequency converter 3. The carrier chrominance signal of the reference carrier-frequency f sc is obtained as a result of the multiplication and is extracted by the bandpass filter (BPF) 5, and outputted to the terminal 8 through the switch 6 and the killer switch 7.

The killer switch is controlled by the discriminating results of the presence of the chrominance signal as in the case of recording.

In the recording and playback system as described above, the ACC operation for adjusting the level of the carrier chrominance signal or the low-band converted chrominance signal by the ACC amplifier 2, the APC operation for providing the jitter of the same phase for the carrier of the frequency f sc+fc supplied to said frequency converter 3 according to the jitter of the phase of the carrier of the carrier chrominance signal or the low-band converted chrominance signal, and the color killer operation to determine whether the carrier chrominance signal of the low-band converted chrominance signal is inputted from the terminal 1 and prohibit the signal output to the terminal 8 when the chrominance signal is not present are carried out.

These operations are conventionally carried out in the following method.

In the first place, during recording, from the carrier chrominance signal which is passed by the ACC amplifier 2, and, during reproduction, from the reproduced carrier chrominance signal converted of the frequency after passing the bandpass filter 5, the burst portion is extracted by the burst gate (BG) 10.

During both recording and reproduction in the ACC operation, the peak level of the extracted burst portion is detected by the ACC detected (ACC DET) 11. The direct current (DC) portion is extracted by the lowpass filter (LPF) 12, and is supplied to the ACC amplifier 2 as the signal used for gain control. The ACC amplifier 2, if the signal DC voltage for gain control is high, i.e., the level of the burst portion is large, operates in a direction to decrease the gain, and if the signal DC voltage is low, the ACC amplifier 2 operates in a direction to increase the gain so that the level of the chrominance signal is kept constant due to the above-mentioned feed-back loop.

During recording in the APC operation, the signal generator (VXO) 13 functions as the voltage control oscillator to oscillate at the color subcarrier frequency f sc. This oscillation output and the burst portion obtained by the burst gate 10 are synchronously detected by the phase comparator (PC), and the results of which are fed back to the frequency control input of the signal generator 13 through the lowpass filter (LPF) 15 and the switch 16. Thus, the signal generator 13 performs the synchronous detection using the phase comparator 14 and oscillates at a frequency so that the signal passed through the lowpass filter 15 becomes equal to 0.

The oscillation output of the signal generator 13 turns into the color subcarrier frequency which is synchronized by the phase difference between the extracted burst portion and 90° and is supplied to one input of the frequency converter 17. The other input is supplied with the low-band converter carrier. To generate the low-band converted carrier, a signal of a frequency nfH multiplied by n (n is a positive integer) of the frequency fH of the horizontal synchronous signal inputted from the terminal 23 is generated during the recording by the phase locked loop (hereinafter PLL) consisting of the phase comparator (PC) 18, lowpass filter (LPF) 19, switch 20, signal generator 21, and 1/n divider (1/n) 22. The generated signal is divided by the carrier generator circuit (PS/PI) 24 and it phase is shifted by 90° (hereafter PC process) per one horizontal interval in an opposite direction with respect to each track based on the recorded track discriminating signal PG inputted from the terminal 25. Or the phase is inverted (hereafter PI process) per one horizontal interval of every other track. The frequency fc is 40 fH and is shifted by 90° per one horizontal interval when an NTSC television signal is recorded by a VHS system.

For recording, the chrominance subcarrier of the frequency f sc and the low-band converted carrier of the frequency fc are multiplied by the frequency converter 17, and a signal of the frequency f sc sc+fc is extracted by the bandpass filter (BPF) 26. The extracted signal is supplied to the frequency converter 3, whereby the low-band converted carrier of the low-band converted chrominance signal to be outputted from the terminal 8 and the low-band converted chrominance signal generated by the carrier generator circuit 24 are synchronized. For reproduction, since the signal generator 13 becomes a reference oscillaor to generate the color subcarrier frequency of the reference frequency f sc because the signal generator circuit 13 is frequency controlled by the constant voltage supplied from the reference voltage circuit (REF) 27 through the switch 16. The output of the phase comparator 14 is supplied to the signal generator 21 through the lowpass filter 15 and switch 20, whereby the signal generating circuit 21 operates so that the frequency converted burst of the reproduced carrier chrominance signal to be ouputted from the terminal 8 is synchronized with the reference color subcarrier generated by the signal generator 13.

With regard to the color killer operation, because the burst taken out from the burst gate 10 has a 90° phase difference during both recording and playback due to the APC operation for the color subcarrier frequency from the signal generator 13, the carrier with the same phase as the burst is produced by shifting the phase of the color subcarrier frequency from the signal generator 13 90° using the 90° phase shifter (90° SHIFT) 28. The carrier is supplied to the killer detector (KILLER DET) 29 for synchronous detection of the taken-out burst. The comparator (COMP) 29 determines the presence of the chrominance signal by the DC voltage after it has passed through the lowpass filter (LPF) 30, and the control signal is supplied to the killer switch 7.

In the chrominance signal processing apparatus of a conventional example as above, three detection circuits are necessary to perform the operations of the ACC, APC and color killer. They are the ACC detector 11 for peak level detection of the burst, the comparator circuit 14 for synchronous detection of the color subcarrier frequency from the burst and signal generator 13, and the killer detector 29 for synchronous detection of 90° phase shifted color subcarrier frequency from the signal generator 13 as well as the burst. Because these circuits are complicated and of large scale in order to achieve respectively specified characteristics and because the performance of the respective operations are determined by the characteristics of the detection circuits and the analog lowpass filter of the subsequent stages, it is difficult to establish the circuit constant. The conventional chrominance signal processing apparatus has a further disadvantage due to the increased number of externally added parts.

SUMMARY OF THE INVENTION

It is an object of the present invention to provide a chrominance signal processing apparatus which has a simplified circuit configuration, improved performance, and reduced number of parts.

In order to achieve this object, a chrominance signal processing apparatus according to the present invention, when recording a carrier chrominance signal on a recording medium after converting the signal to a low-band signal, carries out detection of a burst including the presence of carrier chrominance signal, carrier phase information and signal level information for the low-band converted chrominance signal, and, when reproducing the low-band converted chrominance signal recorded on the recording medium, carriers out detection of the burst for the low-band converted chrominance signal. Thus, the detection of the information of the burst is carried out in a state of the low-band converted chrominance signal both during recording and reproduction.

DESCRIPTION OF THE PREFERRED EMBODIMENTS

Embodiments according to the present invention will hereafter be described with reference to the drawings.

Figure 2:
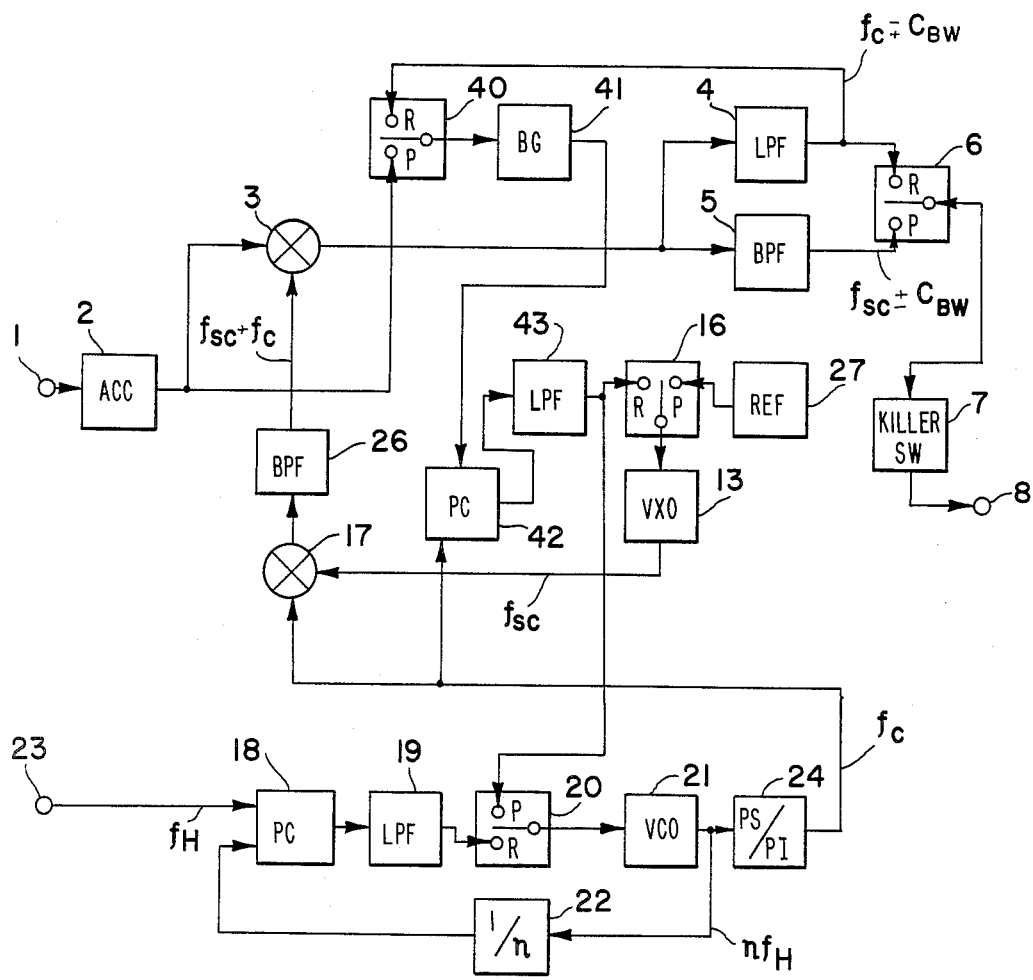
FIG. 2 is a block diagram of an embodiment of the present invention in which the burst detection for the APC operation is carried out with the low-band converted chrominance signal during both recording and reproduction.

FIG. 2 is a block diagram of a chrominance signal processing apparatus in an embodiment in which the detection of the burst for the APC operation is carried out with the low-band converted chrominance signal during both recording and reproduction. In FIG. 2, element 21 is a first signal generator (VCO); element 13 is a second signal generator (XVO); element 18 is a first phase comparator (PC); element 42 is a second phase comparator (PC); element 24 is a carrier generating circuit (PS/PI); element 27 is a reference voltage source (REF); element 20 is a first switch; element 16 is a second switch; element 40 is a third switch; terminal 1 is a signal input terminal; element 2 is an ACC amplifier (ACC); elements 3 and 17 are frequency converters; element 4 is a lowpass filter (LPF); element 5 is a bandpass filter (BPF); element 6 is an output signal select switch; element 7 is a killer switch (KILLER SW); terminal 8 is a signal output terminal; terminal 23 is a horizontal synchronous signal input terminal; element 19 is a lowpass filter (LPF); element 22 is a 1/n divider (1/n); element 26 is a bandpass filter (BPF); element 41 is a burst gate (BG), and element 43 is a lowpass filter (LPF).

During recording, the carrier chrominance signals of the carrier-frequency f sc is supplied from the input terminal 1, and its level is adjusted by the ACC amplifier 2, and supplied to one input of the frequency converter 3. The frequency converter 3 is supplied with a carrier of the frequency f sc+fc from the frequency converter 17 through the bandpass filter 26, and the carrier frequency appears at the output of the frequency converter 3 with the chrominance signal of f sc+fc+f sc=2 f sc+fc and the chrominance signal of f sc+fc−f sc=fc being mixed. Then, from the output signal of the frequency converter 3 only the low-band converted chrominance signal fc±CBW (CBW is a basic band of chrominance signal) having the carrier-frequency fc is extracted by using the lowpass filter 4, so that the low-band converted chrominance signal for recording is produced at the output terminal 8 through the switch 6 and the killer switch 7.

In the frequency converter 17, the low-band converted carrier of the frequency fc from the carrier generating circuit 24 and the carrier of the frequency f sc from the second signal generator 13 are multiplied by the frequency converter 17 so as to extract the carrier of f sc+fc using the bandpass filter 26. To generate the low-band converted carrier fc, the phases of the horizontal synchronous signal inputted from the terminal 23 and the signal of the signal generator 21 divided in frequency by the divider 22 are compared by the phase comparator 18. The result of the comparison is supplied to the frequency control input of the signal generator 21 through the lowpass filter 19 and switch 20, thereby obtaining a signal from the signal generator 21 of a frequency nfH multiplied by an integral multiple of the horizontal synchronous frequency fH by processing the nfH signal by division and phase shifting or phase inversion by the carrier generating circuit 24. The oscillation frequency of the second signal generator 13 of the frequency f sc is controlled by the output of the switch 16, and the output of the phase comparator 42 is provided during recording through the lowpass filter 43. The switch 40 is a switch for switching the signal to be supplied to one input of the phase comparator 42, and, during recording, the burst of the low-band converted chrominance signal for recording coming from the lowpass filter 4 is supplied to the other input of the phase comparator 42 through the switch 40 and the burst gate 41. The low-band converted carrier from the carrier generating circuit 24 is fed to the other input of the phase comparator 42, where the burst of the low-band converted chrominance signal for recording the low-band converted carrier from the carrier generating circuit 24 are compared in phase, and the result of the phase comparison is supplied to the switch 16. During recording, a PLL is configured with the closed loop consisting of the phase comparator 42, lowpass filter 43, switch 16, signal generator 13, frequency converter 17, bandpass filter 26, frequency converter 3, lowpass filter 4, switch 40, and burst gate 41, so that the carrier of the low-band converted chrominance signal from the terminal 8 has the same frequency and a constant phase as that of the low-band converted frequency carrier produced by the carrier generating circuit 24.

For reproduction, the low-band converted chrominance signal of the carrier-frequency fc separated from the reproduced signal extracted from the magnetic tape is supplied to the input terminal 1. The low-band converted chrominance signal is supplied to the frequency converter 3. A signal of the frequency f sc+fc is supplied to the frequency converter circuit 3 from the frequency converter 17 through the bandpass filter 26. From the chrominance signal of the carrier-frequency f sc+fc+f sc=2 f sc+fc obtained at the output of the frequency converter 3 and mixed with the chrominance signal of the carrier-frequency f sc+fc−f sc=fc, the carrier chrominance signal of the carrier-frequency fsc is extracted by means of the bandpass filter 5, and is outputted to the terminal 8 through the switch 6 and the killer switch 7. To produce the carrier of the frequency f sc+fc coming from the frequency converter 17, because the output of the reference voltage source 27 is used as the frequency control input of the signal generator 13 by means of the switch 16 in the first place, the signal generator 13 becomes the fixed oscillator to oscillate at the reference color subcarrier frequency f sc, and the oscillation output of the signal generator 13 is supplied to one input of the frequency converter 17. The signal generator 21 is controlled by the output of the phase comparator 42 through the lowpass filter 43 and switch 20. The phase comparator 42 compares phases of the burst portion of the low-band converted chrominance signal supplied from the input terminal 1 through the burst gate 41 and the low-band converted carrier produced by the carrier generating circuit 24 to thereby output the result of the phase comparison as a control voltage. The PLL operation is carrier out by the closed loop comprising the phase comparator 42, lowpass filter 43, switch 20, signal generator 21, and carrier generating circuit 24. The oscillation frequency of the signal generator 21 is controlled so that the carrier-frequency of the carrier chrominance signal from the output terminal 17 is synchronous with the reference color subcarrier frequency from the signal generator 13.

The following is a description of an embodiment of a digital circuit used for the burst detection so as to carry out the APC operation.

Figure 3:
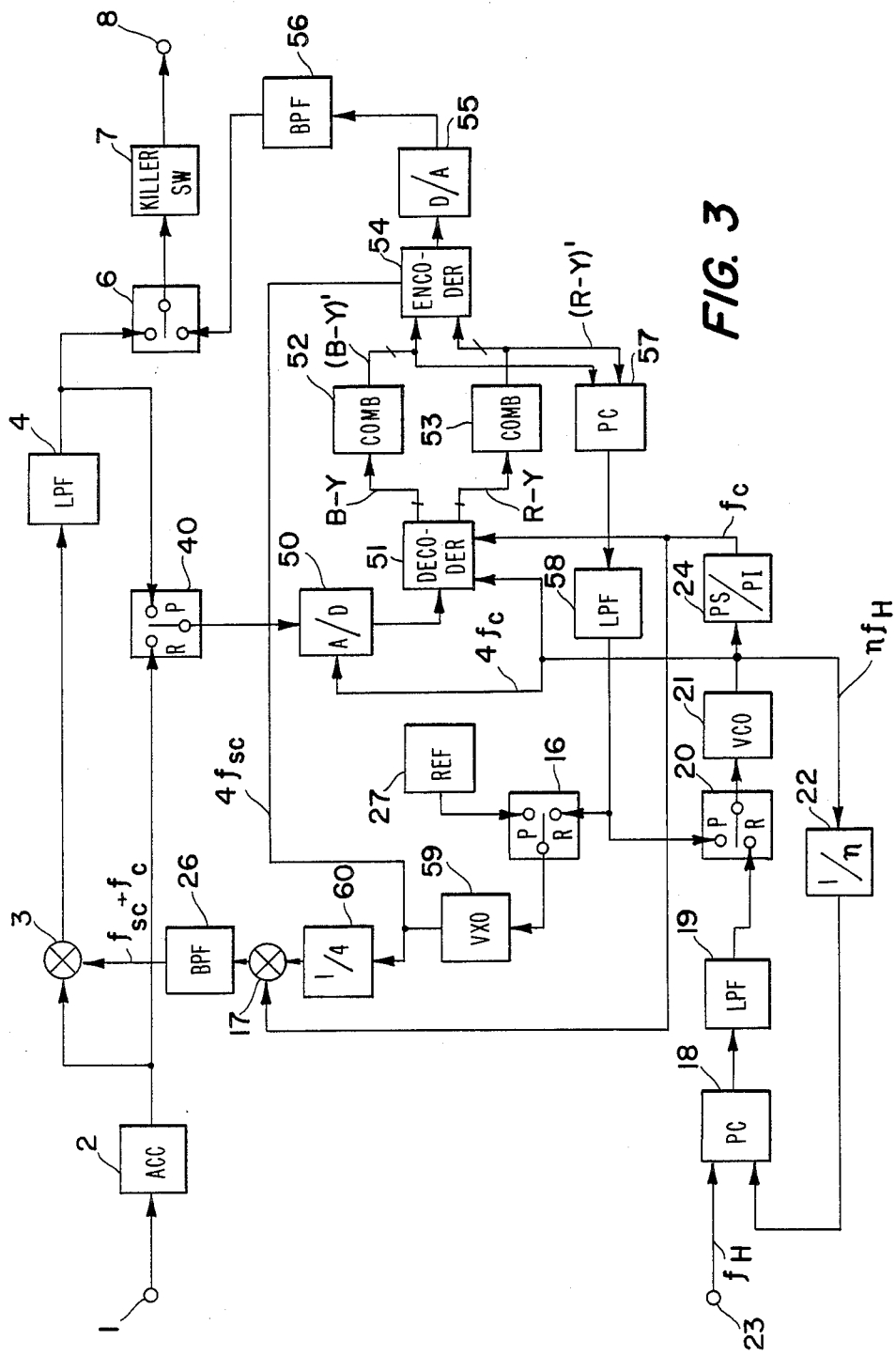
FIG. 3 is a block diagram of another embodiment of the present invention in which a digital circuit is employed as the burst detecting part for the APC operation.

FIG. 3 is a block diagram of a chrominance signal processing apparatus in an embodiment including a digital circuit used for the burst detection to carry out the APC operation according to the present invention. In FIG. 3, element 21 is a first signal generator (VCO); element 59 is a second signal generator (VXO); element 24 is a carrier generating circuit (PS/PI); element 27 is a reference voltage source (REF); element 20 is a first switch; element 16 is a second switch; element 40 is a third switch; element 50 is an A/D converter (A/D); element 51 is a decoder (DECODER); element 54 is an encoder (ENCODER); element 55 is a D/A converter (D/A); element 45 is a bandpass filter (BPF); element 57 is a control voltage generating circuit (PC); element 58 is a lowpass filter (LPF), and element 60 is a ¼ divider (¼).

Figure 1:
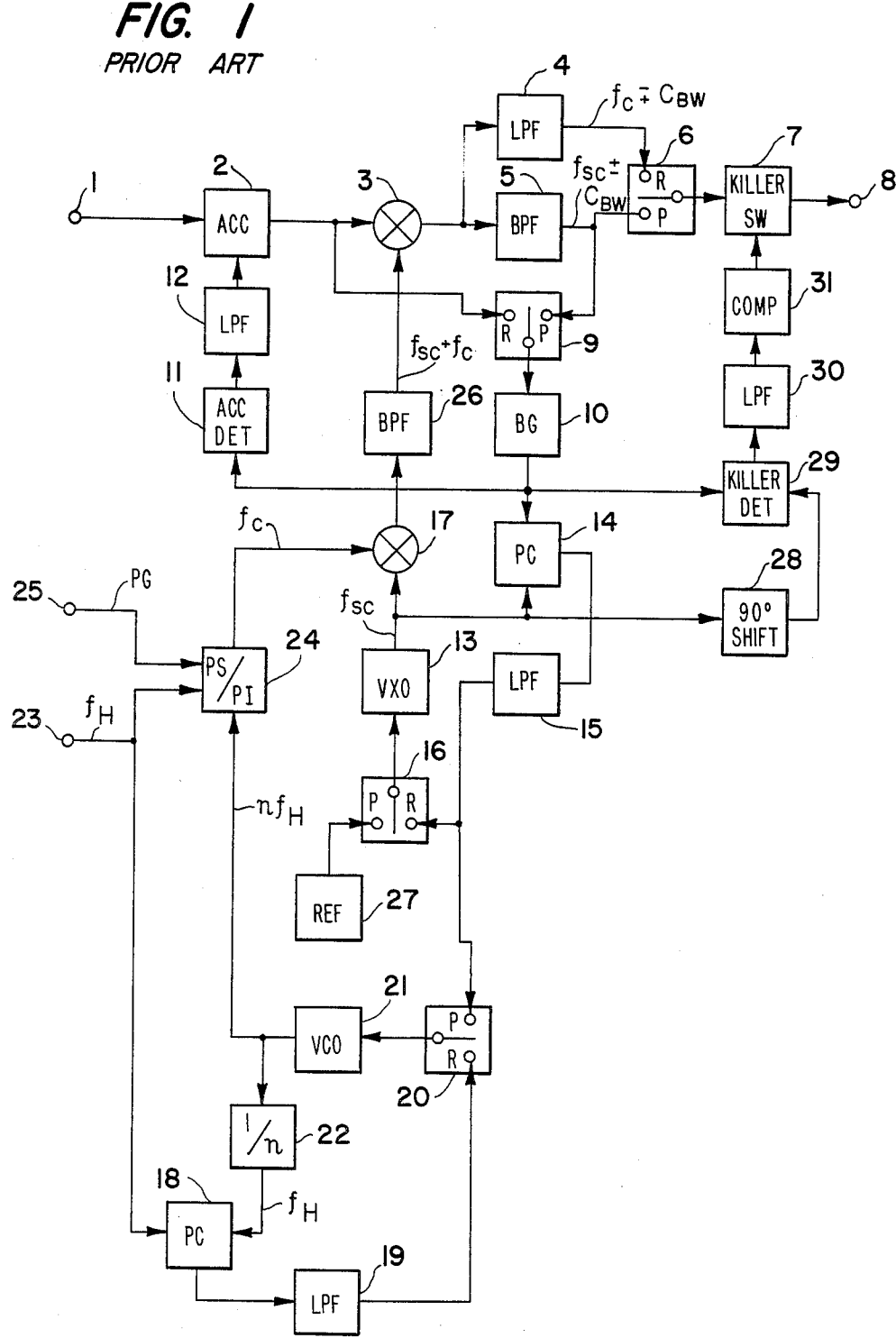
FIG. 1 is a block diagram showing a configuration of a conventional chrominance signal processing apparatus.

For recording, in a fashion similar to the conventional embodiment of FIG. 1 or the embodiment of FIG. 2 according to the present invention, the carrier chrominance signal of the carrier-frequency f sc is supplied from the input terminal 1 and passes through the frequency converter 3, lowpass filter 4, switch 6, and killer switch 7. The low-band converted chrominance signal of carrier-frequency fc is provided at the output terminal 8. In addition to the carrier chrominance signal, the frequency converter 3 is supplied with the signal of the frequency of f sc+fc extracted by the bandpass filter 26.

The frequency of f sc+fc is the sum extracted by the bandpass filter 26 from the low-band converted carrier of the frequency fc from the carrier generating circuit 24 and the color subcarrier frequency of the frequency f sc from the ¼ divider 60 which are multiplied together by the frequency converter 17. The method to produce the low-band converted carrier of the frequency fc to be supplied to the frequency converter 17 is quite the same as the embodiment of FIG. 2. The method to generate the color subcarrier frequency of the frequency f sc is somewhat different from the embodiment of FIG. 2. Instead of the second phase comparator 42 in FIG. 2, an almost equivalent operation is carried out by the A/D converter 50, decoder 51, digital comb filters 52 and 53, and control voltage generating circuit 57. The low-band converted chrominance signal, after passing through the lowpass filter 40 is supplied to the A/D converter 50 through the switch 40 and is sampled and A/D converter at a frequency of 4 fc which is four times the low-band converted carrier-frequency fc.

The sampling clock of the A/D converter 50 is the output of the first signal generator 21. The low-band converted chrominance signal converted into digital data by the A/D converter 50 is separated by the decoder 51 into two color difference signals of B-Y and R-Y. The decoder 51 is supplied with the low-band converted carrier of the frequency fc from the carrier generating circuit 24 and the sampling clock of the frequency 4 fc from the signal generator 21. When the burst and the low-band converted carrier of the low-band converted chrominance signal are synchronized, the result of sampling the low-band converted chrominance signal by the clock of the frequency four times the low-band converted color subcarrier frequency produces repeated data of B-Y, R-Y, -(B-Y), -(R-Y) of the color difference signal components. This repeated data is utilized for separation into two color difference signals. The two separated color difference signals of B-Y, R-Y are added to the data before one horizontal interval or two horizontal interval by the digital comb filters 52 and 53, and the result of addition produces color difference signals (B-Y)', (R-Y)' which are supplied to the control voltage generating circuit 57. Here the digital comb filters 52 and 53 are used for reproduction but are not used for recording, and the output data B-Y, R-Y of the decoder 51 may be supplied directly to the control voltage generating circuit 57.

The control voltage generating circuit 57 consists of an arithmetic circuit, a digital filter and a D/A converter, where the phase error between the demodulation timing and the low-band converted chrominance signal is detected by the A/D converter 50 and decoder 51 from the values of the burst section of the color difference signal data of the low-band converted chrominance signal. A voltage equivalent to the phase error is produced and supplied to the second signal generator 59 through the analog lowpass filter 58 and switch 16 to thereby control the oscillation frequency. The second signal generator 59 oscillates at a frequency four times the color subcarrier frequency f sc. The oscillation output is divided by the ¼ divider 60 and is supplied to the frequency converter 17 as the color subcarrier frequency of the frequency f sc. During recording, a PLL is configured with the closed loop consisting of the frequency converter 17, bandpass filter 26, frequency converter 3, lowpass filter 4, switch 40, A/D converter 50, decoder 51, digital comb filters 51 and 52, control voltage generating circuit 57, lowpass filter 58, switch 16, signal generator 69, and ¼ divider 60. As to the method to produce a voltage equivalent to the phase error in the control voltage generating circuit 57, if, for example, the color television signal of an NTSC system is to be recorded and reproduced, since the burst has a constant magnitude in one direction of the B-Y component of the color difference signal, the data (R-Y)' in which components do not appear may be D/A converted as they are and passed through the analog lowpass filter 58 to thereby produce such a voltage. While, if tan $\Theta = (R-Y)'/(B-Y)'$ is obtained digitally from the color difference signal data (B-Y)', (R-Y)', then $\Theta$ is the very phase error and the voltage equivalent to $\Theta$ may be D/A converted. By inserting a 0th digital hold filter prior to the D/A converter, the analog lowpass filter after the D/A converter may be omitted and it is possible to output the average error of the burst section.

By the operation of the PLL, after separation by the decoder 51, the oscillation frequency or oscillation phase of the signal generator 59 is controlled so that the color difference signal data (R-Y)' having passed the digital comb filter is set to be equal to 0 or otherwise such that tan $\Theta = (R-Y)'/(B-Y)' = 0$. As a result of this, the burst of the low-band converted chrominance signal outputted from the terminal 8 synchronizes with the low-band converted carrier produced by the carrier generating circuit 24.

The operation of reproduction is described below.

In the embodiment according to the present invention, the frequency converters 3 and 17 are not used for reproduction. The reproduced low-band converted chrominance signal from the terminal 1 is supplied to the A/D converter 50 through the switch 40. The reproduced low-band converted chrominance signal which is A/D converted is separated into B-Y and R-Y signals by the decoder 51 as in the case of recording, added to the data before 1H or 2H by the digital comb filters 52 and 53, and supplied to the encoder 54 as (B-Y)', (R-Y)'. The encoder 54 is supplied from the signal generator 59 with a clock of the frequency 4 f sc which is four times the color subcarrier frequency f sc. Because the control input of the oscillation frequency of the signal generator 59 is different from that of recording and the reference voltage source 27 provides the reference voltage through the switch 16, the signal generator 59 oscillates at four times the reference frequency f sc. Based on the oscillation clock from the signal generator 59, the encoder 54 repeatedly outputs the total of four signals, i.e., the color difference signals (B-Y)', (R-Y)' and data -(B-Y)', -(R-Y)' which are digitally converted to the color difference signal data (B-Y)', (R-Y)', in order of (R-Y)', (B-Y)', -(R-Y)', -(B-Y)' respectively. The reproduced carrier chrominance signal of the carrier frequency f sc is obtained by converting these repeated signals into analog values by the D/A converter 55.

The bandpass filter 56 is to remove the high harmonics of the reproduced carrier chrominance signal which is modulated digitally and is taken out from the terminal 8 by means of the switch 6 and the killer switch 7. In order for the carrier-frequency of the reproduced carrier chrominance signal to become the reference frequency without jitter, it is necessary for the low-band converted chrominance signal to be separated accurately into two color difference signals by the A/D converter 50 and decoder 51. For this reason, by supplying, during recording, the error voltage from the control voltage generating circuit 57 supplied to the signal generator 59 to the frequency control input of the signal generating circuit 21 by means of the switch 20, a PLL is configured with the A/D converter 50, decoder 51, comb filters 52 and 53, control voltage generating circuit 57, lowpass filter 58, switch 20, signal generator 21, and carrier generating circuit 24, whereby the low-band converted carrier synchronized with the burst of the reproduced low-band converted chrominance signal and the clock for A/D conversion of the frequency 4 fc are obtained.

As described above, when recording the carrier chrominance signal on the recording medium after converting to the low-band, the carrier phase information of the carrier chrominance signal is detected by the burst which is converted into the low-band converted chrominance signal. When reproducing the low-band converted chrominance signal recorded on the recording medium, the phase of the burst is detected with the low-band converted chrominance signal, thereby enabling the phase comparison for the PLL (which is conventionally been carried out with the color subcarrier frequency (3.58 M Hz in the case of an NTSC system)) with the low-band converted frequency (629 K Hz in the case of a VHS system). Thus, a PLL of simple circuitry and yet of high performance can be obtained.

It is possible to materialize easily and simply the circuit configuration to detect he phase of the burst for the APC operation in the state of the low-band converted chrominance signal during recording and reproducing. The configuration comprises: the first signal generator used to generate a signal of the frequency which is an integral multiple of the low-band converted frequency; the carrier generating circuit to produce the low-band converted carrier by the signal from the first signal generator; the second signal generator to produce the signal of the frequency which is an integral multiple of the color subcarrier frequency; the first phase comparator to compare the phases of the division signal and horizontal synchronous signal of the signals from the first signal generator; the second phase comparator to compare the phases of the burst of the low-band converted chrominance signal and the low-band converted carrier from the carrier generating circuit; the reference voltage source to provide a constant control signal having a frequency of the second signal generator as the reference frequency; and the first, second and third switches. This configuration is capable of phase detection of the burst for the APC operation in the state of the low-band converted chrominance signal during recording and reproducing by switching with the first switch the control input of the first signal generator by the signal from the first phase comparator and the signal for the second phase comparator; by switching with the second switch the control input of the second signal generator by the signal from the second phase comparator and the constant control signal from the reference voltage source; and by switching with the third switch the burst of the low-band converted chrominance signal to be inputted into the second phase comparator by the burst of the low-band converted chrominance signal to be recorded on the magnetic tape and by the burst of the low-band converted chrominance signal to be recorded on the magnetic tape and by the burst of the low-band converted chrominance signal reproduced from the magnetic tape.

Furthermore, the second phase comparator has a demodulator, if configured to compare the phases from the values of the burst section of two demodulated color difference signals, various phase comparison methods can be considered, being effective to increase the degree of freedom in design, and can be materialized by the digital sampling demodulation at low speed, and is suitable for digital circuitry.

As the frequency conversion method for reproducing, if such a method is employed such that a quadrature two phase balanced modulated wave is produced by the specified carrier-frequency after demodulating the low-band converted chrominance signal into two color difference signals in the demodulator, the demodulator of the second phase comparator and the demodulator for demodulating the low-band converted chrominance signal into two color difference signals can be shared as a single demodulator, which simplied the circuit configuration.

The demodulator may have an A/D converter for sampling and A/D converting the low-band converted chrominance signal by a clock of four times the low-band converted frequency from the first signal generator, and a decoder to digitally demodulate the digital data outputted from the A/D/ converter into two color difference signals. The R-Y component of the low-band converted chrominance signal demodulated into the digital data may be D/A converted directly or after being processed with the digital filter. Or, the phase error may be digitally obtained from the R-Y component and B-Y component of the demodulated low-band converted chrominance signal, and D/A converted. The thus obtained D/A converted signal is used, directly or after passed through an analog filter, as a control signal to be supplied to the first or second switch to control the oscillation frequency of the first or second signal generator. In this configuration, by providing various digital filters and arithmetic circuits before the D/A converter, it becomes possible to pull-in the PLL. To set circuit constants, and to process non-linearly, which were impossible by the the conventional analog circuits. Also, characteristics can be improved. By digital 0th holding, the analog lowpass filter is substituted. Therefore, digitalization and integration of circuits and reduction of circuit components can be easily realized.

Figure 4:
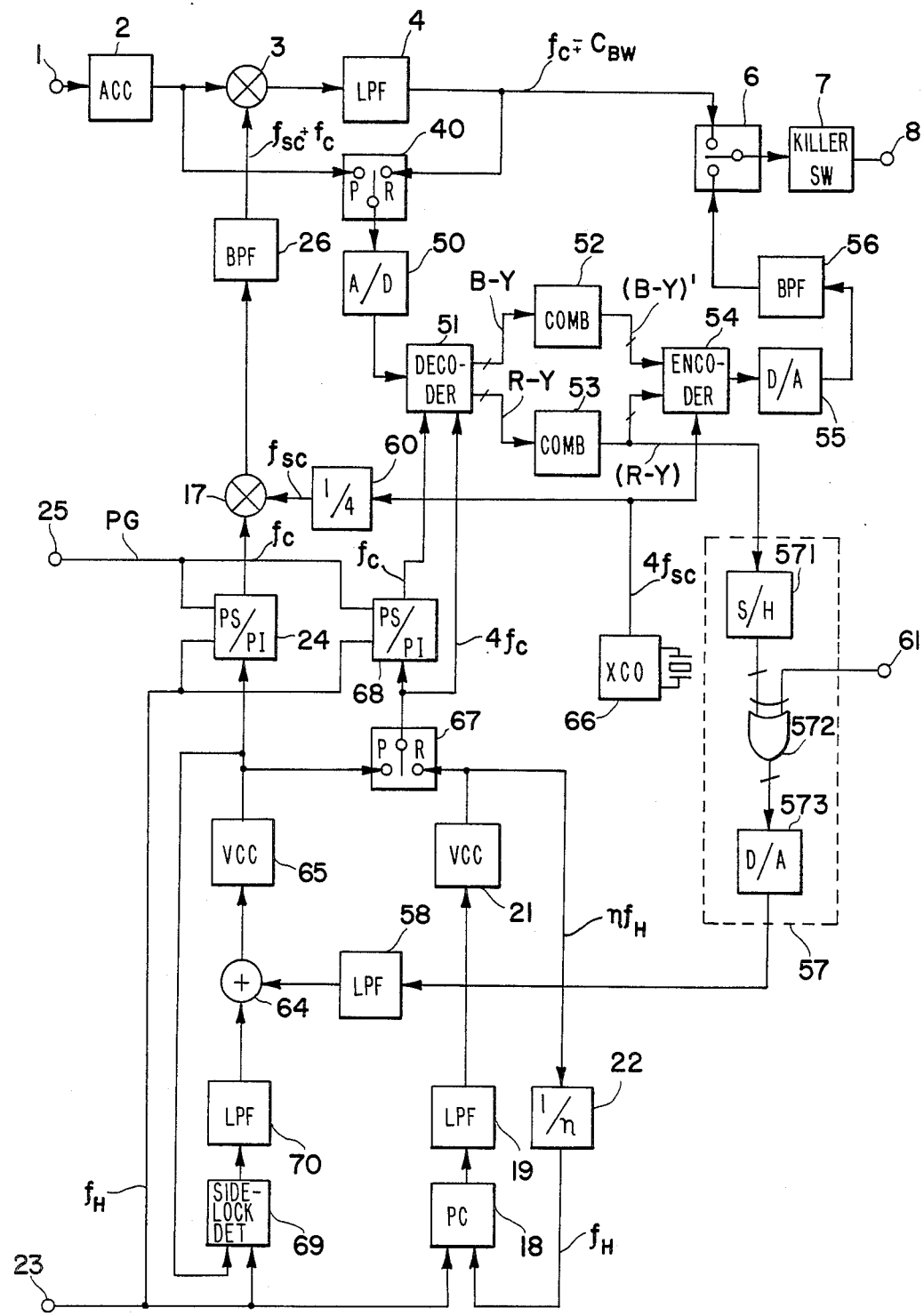
FIG. 4 is a block diagram of still another embodiment of the present invention in which a fixed frequency oscillator is used instead of the crystal oscillator which was conventionally controlled of the frequency and phase for the APC operation during recording.

Another embodiment will next be described, regarding the burst detection for the APC operation carried out with the low-band converted chrominance signal. FIG. 4 is a block diagram of the chrominance signal processing apparatus in such an embodiment.

During recording, the carrier chrominance signal inputted from the terminal 1 is level adjusted by the ACC amplifier 2, multiplied by the carrier of a frequency f sc+fc in the frequency converter 3, extracted of the low-band converted chrominance signal by the lowpass filter 4, to thereby obtain the recording low-band converted chrominance signal finally at the terminal 8 through the switch 6 and the killer switch 7. These steps are the same as those of the conventional example of FIG. 1 or the other embodiments shown in FIG. 2 and FIG. 3. During reproduction, the low-band converted chrominance signal which is inputted from the terminal 1 through the switch 40 and passed through the ACC amplfier 2, is supplied to the A/D converter 50. The low-band converted chrominance signal is converted into digital data, demodulated digitally by the decoder 51, and passed through the digital comb filters 52 and 53. The two obtained color difference signals are converted by the encoder 54 into one quadrature two-phase balanced modulation signal, which is then converted by the D/A converter 55 into an analog signal, to thereby obtain the carrier chrominance signal of the specified frequency f sc at the terminal 7 through the bandpass filter 56, the switch 6, and the killer switch 7. These steps are the same as those of the other embodiment shown in FIG. 3.

To produce the carrier of the frequency f sc+fc to be supplied to the frequency converter 3 during recording, a signal of the frequency nfH (n times) the frequency of the horizontal synchronous signal inputted from the terminal 23 is first produced by the phase comparator 18, lowpass filter 10, signal generator 21, and divider 22. The signal of the frequency nfH is supplied to a carrier generating circuit (PS/PI) 68 by means of the switch 67 to produce the first low-band converted carrier. With the signal of the frequency nfH and the first low-band converted carrier, the decoder 51 demodulates the low-band converted chrominance signal into two color difference digital signals, which is the same as in the embodiment shown in FIG. 3. Data of the burst portion of the signal (R-Y)' passing through the digital comb filter 53 is held by a sample and hold circuit (S/H) 571, inverted by an Exclusive OR gate 572 using a recording-/reproduction switching signal from a terminal 61, and D/A converted by a D/A converter 572. Namely, a circuit similar to the control voltage generating circuit 57 in FIG. 3 is configured with the sample and hold circuit 571, Exclusive OR gate 572, and D/A converter 573.

Figure 5:
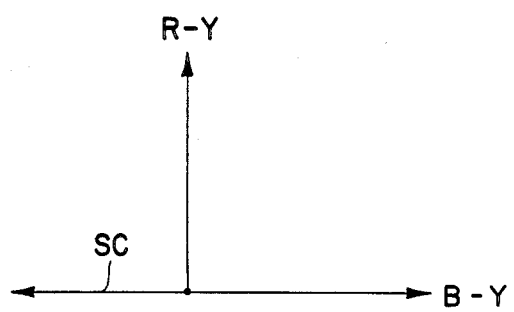
FIG. 5 is a vector diagram of the carrier chrominance signal of an NTSC color picture signal.
Figure 6:
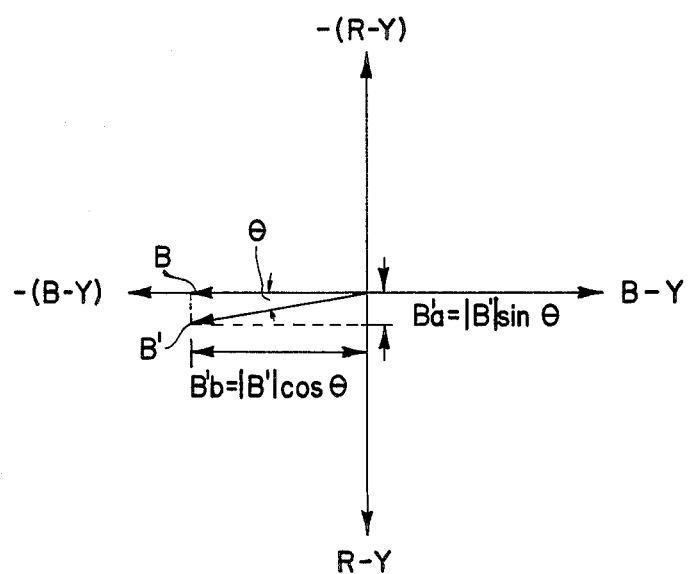
FIG. 6 is a vector diagram of the low-band converted chrominance signal of the carrier chrominance signal of an NTSC color video signal.

The carrier chrominance signal of the color television signal is the quadrature two-phase balanced modulated wave consisting of R-Y and B-Y of the color difference signal, and, if R-Y and B-Y have a phase vector which is different by 90° and the burst SC of the carrier chrominance signal is of an NTSC system as shown in FIG. 5, then the carrier chrominance signal will have a vector which is in the opposite direction of that of B-Y. If the carrier chrominance signal of the NTSC system is converted to low-band, then such a vector will also turn into the quadrature two-phase balanced modulated wave which is the R-Y axis of the carrier chrominance signal inverted by 180°, but the vector B of the burst will have the vector in the opposite direction B-Y as in the case of the carrier chrominance signal. Therefore, if the frequency nfH of 4 fc which is four times the low-band converted carrier-frequency fc is selected and sampled with the clock of the frequency 4 fc by the A/D converter 50, data of B-Y, R-Y, -(B-Y), -(R-Y) in FIG. 6 are repeated when the clock is in a certain phase. If the repeated data is inverted and code separated based on the phase of the low-band converted carrier from the carrier generating circuit 68, such data can be demodulated into two color difference signal data. Here, if the low-band converted chrominance signal is advanced by an angle Θ relative to the sampling clock for demodulation, the burst of the low-band converted chrominance signal advances by an angle Θ with respect to the demodulation axis like B' of the vector diagram in FIG. 6. Thus, the phase error information of B'a=|B'| sin Θ is obtained on the color difference signal digital data R-Y. R-Y data which is the phase error information passes through the digital comb filter 53 to turn into the data (R-Y)', and the information of the burst section is held as the phase error data by the sample and hold circuit 57. Exclusive OR gate 572 inverts the data from the sample and hold circuit 571 using the recording/reproduction switching signal inputted from the terminal 61. The signal "H" of a high level is received for data inversion from the terminal 36, for example, during recording, and the signal "L" of low level is received during reproduction to allow data to pass through as is. The phase error data inverted by the Exclusive OR gate 572 during recording is supplied to the other signal generator (VCO) 65 by means of the D/A converter 573, lowpass filter 58 and adder 64. The signal generator 65 has its frequency and phase controlled by the phase error data which was inverted and D/A converted to thereby oscillate at a frequency four times the low-band converted carrier-frequency fc. The low-band converted carrier is produced from the oscillation output by the carrier generating circuit 24 and is supplied to one input of the frequency converter 17. To the other input of the frequency converter 17 is supplied the signal of a reference color subcarrier frequency for which the signal of the frequency 4 f sc from the fixed reference oscillator (XCO) 66 is divided into ¼ of its frequency by the divider 60. In the other embodiment of FIG. 3, the frequency and phase of the signal of the frequency f sc to be supplied to the frequency converter 17 are controlled as the result of the phase comparison with the voltage produced by the control voltage generating circuit 57. In this embodiment, however, the frequency and phase of the signal of the frequency fc to be supplied to the frequency converter 17 are controlled. In other words, to the other input of the frequency converter 17 is supplied the signal of reference carrier-frequency for which the signal of the frequency 4 f sc from the fixed reference oscillator 66 is divided into ¼ of its frequency by the divider 60. The voltage to control the frequency and phase which were D/A converted is supplied to the signal generator 65 which has almost equivalent performance to that of the signal generator 21 by means of the lowpass filter 58 and adder 64, to thereby control the frequency and phase of the oscillation output. The second low-band converted carrier is produced by the carrier generating circuit (PS/PI) 24 from the oscillation output of the signal generator 65 based on the horizontal synchronous signal from the terminal 23 and the track judgment signal PG from the terminal 25. The low-band converted carrier is supplied to the other input of the frequency converter 17. As in the case of the other embodiment of FIG. 3, the result of the multiplication by the frequency converter 17 passes through the bandpass filter 26, turns into the carrier of the frequency f sc + fc, and is supplied to the frequency converter 3. By the operation described above, the frequency and phase of the signal generator 65 are controlled during recording so that the first low-band converted carrier produced by the first signal generator 21 and the carrier generating circuit 68 is synchronized in a fixed phase with the burst of the low-band converted carrier chrominance signal. The side lock detector (SIDE LOCK DET) 69, lowpass filter (LPF) 70, and adder 64 are provided to prevent the side lock of the signal generator 65 and must be operated during both of recording and reproduction.

During reproduction, the low-band converted chrominance signal inputted from the terminal 1 is supplied to the A/D converter 50 through the switch 40 after having been level adjusted by the ACC amplifier. The low-band converted chrominance signal inputted into the A/D converter 50 is converted into digital data, demodulated by the decoder 51 into two color difference signal digital data of R-Y and B-Y. The R-Y data is passed through the digital comb filter 53 to produce (R-Y)' data, further passed through the sample and hold circuit 571, gate 572, D/A converter 573, lowpass filter 58, and adder 64, and is supplied to the signal generator 65. The output of the signal generator 65 is supplied to the carrier generating circuit 68 by mean of the switch 67. By supplying the A/D converter 50 and decoder 51 with the output of the signal generator 65 supplied to the carrier generating circuit 68 and the low-band converted carrier produced by the carrier generating circuit 68 based on the output signal, the low-band converted chrominance signal is demodulated accurately into two color difference digital signals of R-Y and B-Y, which is the same operation as described with respect to the other embodiment shown in FIG. 3.

The color difference signal digital data R-Y and B-Y demodulated by the above operation pass through the digital comb filters 52 and 53 to be turned into the data (R-Y)' and (B-Y)' and are supplied to the encoder 54. The encoder 54 needs the clock of the frequency 4 f sc, which is four times that of the reference color subcarrier frequency f sc and such a clock is supplied directly from the reference oscillator 66.

Figure 7:
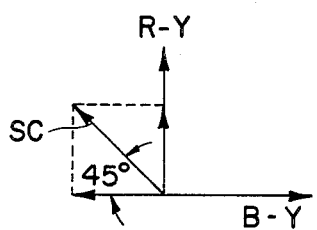
FIGS. 7(a)-7(b) are vector diagrams of the burst in the carrier chrominance signal of the color video signal of a PAL system.
Figure 7:
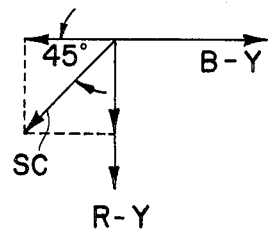

The above description refers to the recording and reproduction of the color teleIvision signal of an NTSC system. But in the case of recording and reproduction of the color television signal of a PAL system, the carrier chrominance signal of the PAL system turns into the vector of which the burst SC has the same magnitude in the direction of -(B-Y) and the direction of R-Y as the vector diagrams of FIGS. 7(a)-7(b), and repeats them every one horizontal interval. The low-band converted chrominance signal also has the vector B of the burst as shown in FIGS. 8(c)-8(d).

Figure 8:
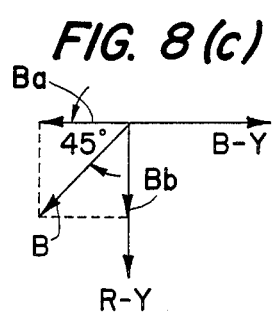
FIGS. 8(c)-8(d) are vector diagrams of the low-band converted burst when the carrier chrominance signal of a PAL system is converted to the low-band.
Figure 8:
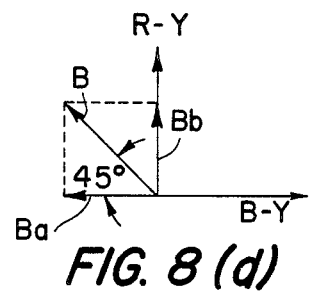

Since the vector B has the same magnitude in the directions of R-Y and -(B-Y) and the R-Y axis repeats inverting at every one horizontal interval, by for example providing the digital comb filters 52 and 53 for adding the R-Y and B-Y data of one horizontal interval before and the present R-Y and B-Y data before or after the sample and hold circuit 571, Bb of FIGS. 8(c) and 8(d) which is the R-Y data of the burst B is cancelled and can be handled in the same manner as the color television signal of a NTSC system.

In the chrominance signal processing apparatus in the above embodiments according to the present invention, there is no independent phase comparator to compare the phases of two carriers of the low-band converted frequency.

If the low-band converted chrominance signal is digitally demodulated by the decoder 51, the burst portion in the R-Y data of the two color difference signals is considered the phase error between the low-band converted chrominance signal supplied to the decoder 51 and the first low-band converted carrier supplied from the carrier generating circuit 68 as the demodulation axis. Therefore, the results of the phase comparison or the oscillation phase control signal of the signal generator 65 is produced by the control voltage generating circuit 57 consisting of the sample and hold circuit 571, gate 572, and D/A converter 573 from the burst portion of the data (R-Y)' after being passed through the digital comb filter 53. In other words, in order to convert the frequency of the low-band converted chrominance signal into the carrier chrominance signal during reproduction, the modulation circuit used to demodulate a signal into the color difference signal is also employed as the phase comparator. However, the phase comparator may be provided separately for the phase comparison of the first low-band converted carrier produced by the carrier generating circuit 68 and the burst of the low-band converted chrominance signal. Also, when using the frequency converter 3 as the chrominance signal processing apparatus of the conventional example in FIG. 1 as a means of frequency conversion during reproduction, the low-band converted carrier of the frequency fc to be supplied to one input of the frequency converter 17 may be replaced with the low-band converter carrier synchronized with the fixed phase with the burst of the low-band converted chrominance signal during reproduction as the low-band converted carrier produced by the carrier generating circuit 68 in an embodiment in FIG. 4. Furthermore, the signal of the frequency f sc to be supplied to the other input of the frequency converter 17 may be replaced by the signal from the reference oscillator to oscillate with the specified carrier-frequency.

The embodiment shown in FIG. 4 comprises: the first phase comparator to compare phases of the two signals of the horizontal synchronous frequency; the second phase comparator to compare phases of the two carriers of the low-band converted frequency; the two signal generators to oscillate at the frequency of an integral multiple of the low-band converted chrominance signal; the reference oscillator to oscillate at an integral multiple of the reference color subcarrier frequency; and the inversion circuit to invert the result of the comparison of the two phase comparator circuits. During recording, the frequency of the signal generated by one signal generator is controlled by the result of the comparison of the first phase comparator to thereby obtain at the output of the signal generator a signal of the frequency which is an integral multiple of the horizontal synchronous frequency. The first low-band converted carrier is produced by the oscillation output. Phases are of the burst of the low-band converted chrominance signal for recording and the first low-band converted carrier are compared by the second phase comparator. The frequency and phase of the other signal generator is controlled by the result of this comparison. The output thereof is used to produce the second low-band converted carrier so that the carrier chrominance signal is converted to the low-band by the output of the reference oscillator and the second low-band converted carrier. Either one of the signal generators is operated during reproduction, and is output is used to produce the low-band converted carrier. The phases of the burst of the low-band converted chrominance signal prior to frequency conversion and the low-band converted carrier are compared by the second phase comparator. The result of this comparison is inverted by the inversion circuit to configure the frequency and phase control of the signal generator. The low-band converted carrier and the output of the reference oscillator are used to convert the low-band converted chrominance signal into the specified carrier frequency. The signal generating circuit 13 in the conventional example shown in FIG. 1 for example or the signal generating circuit 59 of the embodiment in FIG. 3 was operated as the voltage control oscillator during recording. However, such an arrangement can be separated into one reference oscillator and one voltage controlled oscillator. Though the signal generating circuit 13 and the signal generator 59 conventionally employ crystal oscillators of good frequency stability, there are problems wherein the crystal characteristics suitable to carry out the two operations of the reference oscillator and voltage control oscillator cannot be obtained and the oscillation circuit and control circuit become complicated. By such a configuration as the embodiment according to the present invention, the number of oscillators increases, while the oscillator being almost the same as the signal generator 21, which is the conventionally available voltage controlled oscillator, can be used, and one crystal is used as usual. Furthermore, because the crystal oscillator has a fixed frequency, it is possible to configure the circuit with a single CMOS inverter to thereby simplify the circuit configuration. Also, such an arrangement is suitable for integration as a MOS IC.

In the chrominance signal processing apparatus according to the present invention, if one of the two signal generators is used with the first phase comparator to operate only for multiplying the frequency of the horizontal synchronous signal by an integer during recording, and the other signal generator is used with the second phase comparator to operate both during recording and reproduction, power consumption during reproduction can be reduced. In addition, for example, because the analog voltage is switched for recording and reproduction after being passed through the lowpass filter as in the case of the switches 16 and 20 shown in the conventional example in FIG. 1 or the other embodiments shown in FIG. 2 and FIG. 3, an analog switch having a high performance is required. However, the analog switch can be replaced with the digital multiplexer which switches signals from the two signal generators during recording and reproduction in the same fashion as that of the switch 67 in FIG. 4, so that the circuits can be digitized and it is possible to easily provide an interface between blocks.

Furthermore, in much the same way as the embodiments shown in FIG. 2 or FIG. 3, the second phase comparator has the demodulation circuit and the values between the burst section of the two color difference signals are used for phase comparison, various methods of phase comparison can be considered and are effective to increase the degree of design freedom. Because such a configuration can be realized by a low speed sampling demodulator, arithmetic circuit, and D/A converter, such a configuration is suitable for integration of digitized circuits.

Furthermore, in the same way as the embodiment shown in FIG. 3, as a method of the frequency conversion during reproduction, if the low-band converted chrominance signal is first demodulated once by the demodulator into two color difference signals and processed with the quadrature 2-phase balanced modulation by a specified carrier-frequency, the demodulator of the second phase comparator and the demodulator for demodulating the low-band converted chrominance signal into two color difference signals can be shared as a single demodulator, thereby simplifying the circuit.

Furthermore, in much the same way as the embodiment shown in FIG. 3, the modulator may comprise an A/D converter for sampling and A/D converting the low-band converted chrominance signal by a clock which is four times the low-band converted carrier frequency from either of the signal generators, and a decoder for digitally demodulating the digital data from the A/D converter into two color difference signal. The R-Y component of the low-band converted chrominance signal, demodulated into the digital data, is D/A converted directly or after being processed by the digital filter. Or, digital phase errors are obtained from the R-Y component and B-Y component of the demodulated low-band converted chrominance signal, and the digital data corresponding to the phase error is produced and D/A converted. The D/A converted signal is used as the control signal for controlling the oscillator after being passed through an analog filter. In this configuration, by providing various digital filters and arithmetic circuits before the D/A converter, it is possible to easily perform the pull-in of the PLL, and the setting of circuit constants and the non-linear processing which were impossible by the conventional analog circuit. Also, the characteristics of the apparatus can be improved accordingly.

It is also possible to omit the analog lowpass filter by providing a 0th digital holding circuit, allowing easy digitization and integration of circuits as well as the reduction of circuit parts.

Figure 9:
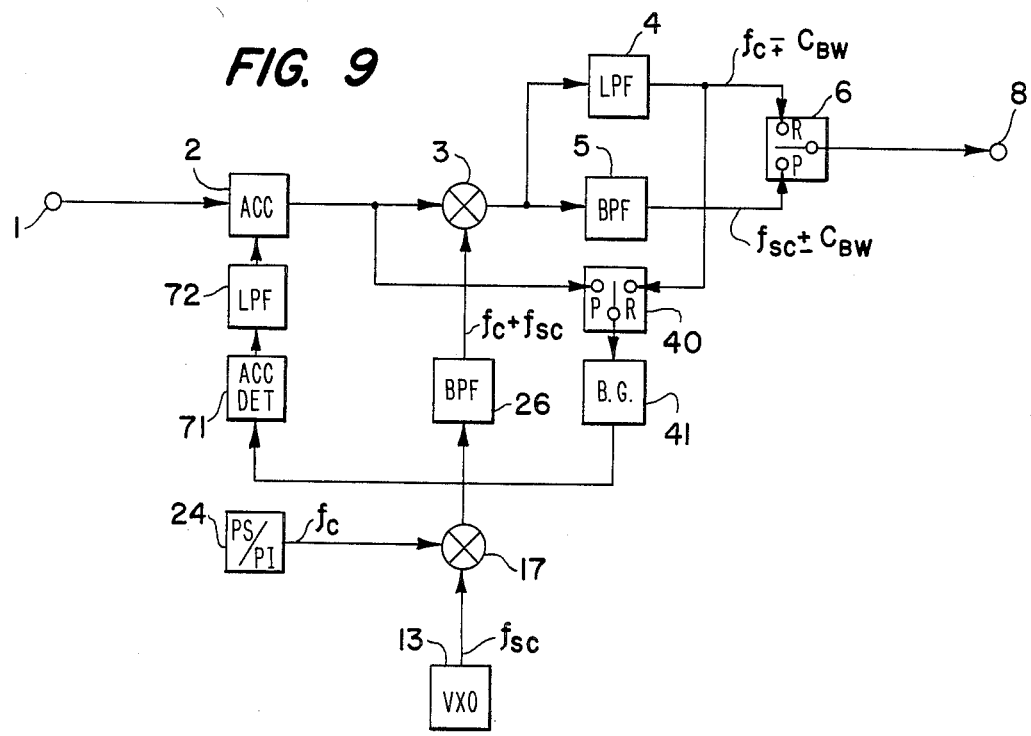
FIG. 9 is a block diagram of an embodiment of the present invention used to perform the ACC operation.

Tow other embodiments according to the present invention will now be explained regarding the burst detection for the ACC operation carried out with the low-band converted chrominance signal. FIG. 9 is a block diagram of a chrominance signal processing apparatus in an embodiment wherein the burst detection for the ACC operation is carried out with the low-band converted chrominance signal. To control the level of the chrominance signal, by the operation of the switch 40, the recording low-band converted chrominance signal which has passed through the lowpass filter is taken in during recording, and during reproduction, the low-band converted chrominance signal before frequency conversion is taken in after it has passed through the ACC amplifier 2. The carrier chrominance signal taken in has only its burst section extracted by the burst gate 41. The peak level of the extracted burst is detected by the ACC detector (ACC DET) 71, and the result of the detection is passed through the lowpass filter (LPF) 72, and supplied to the ACC amplifier as the control signal.

As above, according to this embodiment, the ACC operation is carried out during the recording by the feedback back loop consisting of the ACC amplifier 2, frequency converter 3, switch 40, burst gate 41, ACC detector 71, and lowpass filter 72, and the ACC operation is carried out during reproduction by the feedback operation is carried out during reproduction by the feedback loop consisting of the ACC amplifier 2, switch 40, burst gate 41, ACC detector, and lowpass filter 72.

Now, another embodiment will be described regarding the burst detection for the ACC operation carried out with the low-band converted chrominance signal.

Figure 10:
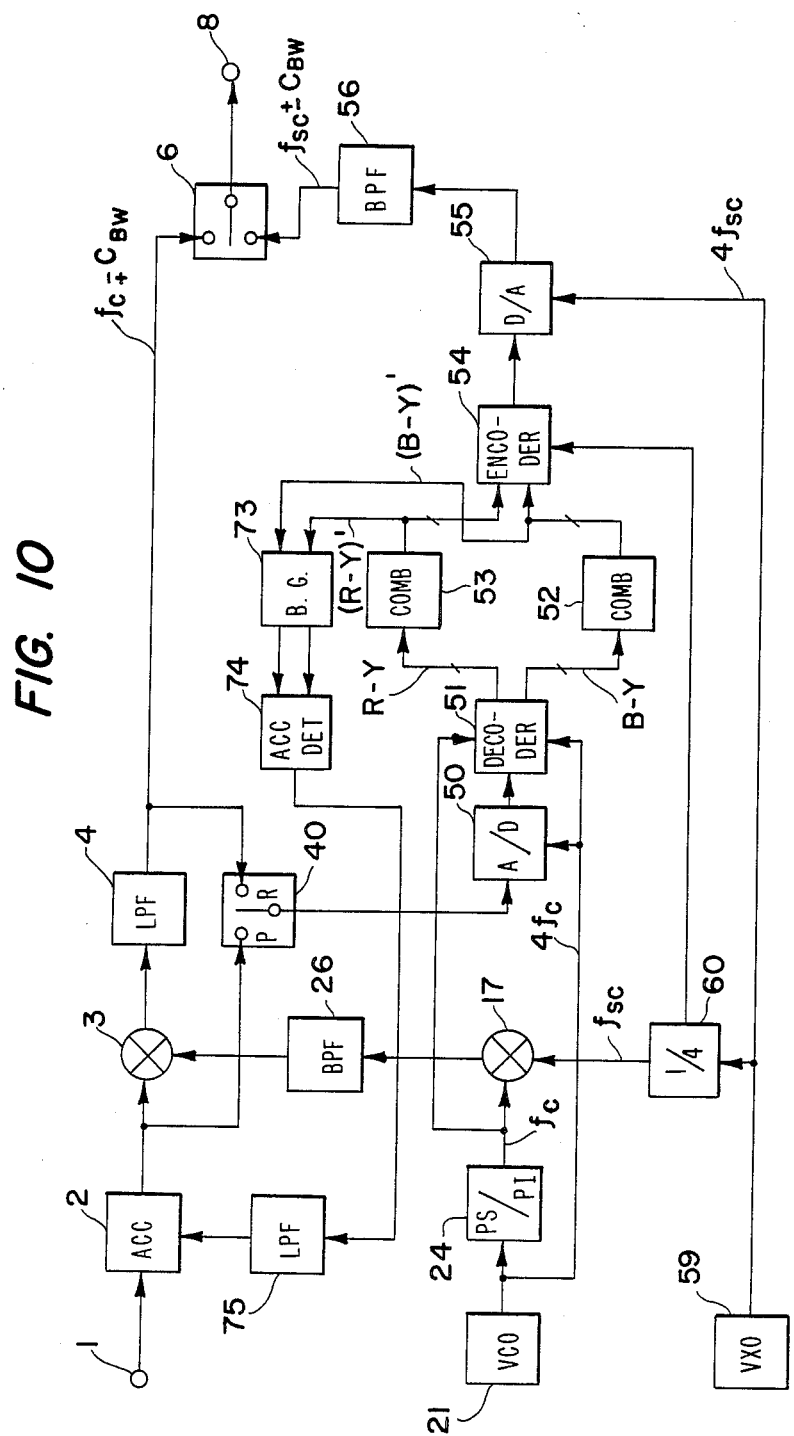
FIG. 10 is a block diagram of another embodiment of the present invention used to perform the ACC operation with a digital circuit.

FIG. 10 is a block diagram of the chrominance signal processing apparatus in such an embodiment. The carirer chrominance signal inputted from the input terminal 1 during recording is passed through the ACC amplifier 2, and converted into the low-band converted chrominance signal of the carrier frequency fc by the same method as that of the conventional example of FIG. 1 or as that of the embodiment of FIG. 9, and supplied to the ouput terminal 8 as the recording low-band converted chrominance signal. The signal generator 59 generates the signal of the frequency 4 f sc which is four times that of the color subcarrier frequency f sc. The 4 fsc signal is divided by the ¼ divider 60, and the color subcarrier of the frequency f sc is produced. In the same manner as the embodiment of FIG. 3, the frequency and phase of the generated signal of the signal generator 59 is controlled during recording so that the color subcarrier of the frequency f sc produced by the divider 60 is synchronized with the burst of the carrier chrominance signal after being passed through the ACC amplifier 2. The signal generator 21 also multiplies the horizontal synchronous signal during recording in the same way as the embodiment shown in FIG. 3, when, for example, recording the color television signal of a VHS recording system. The horizontal synchronous signal is increased by 160 times, namely, multiplied by four times that of the low-band converted frequency fc and supplied to the carrier generating circuit 24 which performs the division and phase shift at every one horizontal interval or processing of a phase inversion. As a result of these processes, the carrier generating circuit 23 produces the low-band converted carrier of the frequency fc and supplies it to the frequency convert 17.

For reproduction, the reproduced low-band converted chrominance signal inputted from the input terminal 1 is amplified to an adequate level by the ACC amplifier 2, and supplied to the A/D converter through the switch 40. For the conversion clock of the A/D converter 50, the signal of the frequency 4 f sc which is four times that of the low-band converted carrier-frequency fc from the signal generator 21 is used. As in the case of the embodiment of FIG. 3, the clock frequency from the signal generator 21 is controlled so that during reproduction, the reproduced low-band converted chrominance signal, obtained after being passed through the carrier generating circuit 24, has its frequency and phase synchronized with that of the burst of the reproduced low-band converted chrominance signal after being passed through the variable gain amplifier 3. The reproduced low-band converted chrominance signal sampled and A/D converted by the A/D converter 50 is converted into the repeated data of the components B-Y, R-Y, -(B-Y), -(R-Y) of the color difference signal.

Decoder 51 performs code inversion of the repeated data and separaton of data according to the timing of the low-band converted carrier from the carrier generating circuit 24 and the clock timing from the signal generator 21 which generates a signal of a frequency which is four times such a timing, and digitally demodulates the data into two color difference signals, B-Y and R-Y. The two color difference signals are respectively supplied to the digital comb filters 52 and 53 to remove the crosstalk component of the reproduced chrominance signal and the higher harmonic components caused by the sampling. R-Y and B-Y data of the color difference signal, after passing through the digital comb filters 52 and 53, turn into (R-Y)', (B-Y)' and are supplied to the encoder 54.

The signal generator 59, during reproduction, becomes the fixed oscillator used to generate the signal of the frequency 4 f sc which is four times that of the reference color subcarrier frequency f sc. The encoder 54 performs the code inversion of the color difference signal data (R-Y)' and (B-Y)' to thereby produce -(R-Y)' and -(B-Y)' of the digital data, and, based on the counting information of the divider 60, outputs the data repeatedly at a period of 1/ f sc in the order of (R-Y)', (B-Y)', -(R-Y)' and -(B-Y)', which are supplied to the D/A converter 55 as the carrier chrominance signal data. The carrier chrominance signal data is converted into the analog signal by the D/A converter 55 and has its higher harmonics due to sampling removed by the bandpass filter 56, and the reproduced carrier chrominance signal is outputted at the terminal 2 by means of the switching circuit 6.

As a method to carry out the ACC operation, the amplitude is computed from the value of the burst portion of the demodulated color difference signal data, and the obtained amplitude value is fed back. This operation will hereafter be explained.

In the first place, during recording, the recording low-band converted chrominance signal is supplied after being passed through the lowpass filter 4 and through the switch 40, to the A/D converter 40 which is used as a part of the digital demodulator for the frequency conversion during reproduction. During recording, the signal generator 21 is controlled as described above to generate the signal which is an integral multiple of the horizontal synchronous frequency and four times the low-band converted carrier frequency fc. Furthermore, the recording low-band converted chrominance signal is controlled by the frequency 4 fc of the signal generated by the signal generator 59 so that the carrier of the recording low-band converted chrominance signal is synchronized with the low-band converted carrier produced by the carrier generating circuit 24. For this reason, it is possible to demodulate the low-band converted chrominance signal into the two color difference signal data R-Y and B-Y by the A/D converter 50 and decoder 51. For reproduction, as explained above, the reproduced low-band converted chrominance signal is for frequency conversion and is demodulated once into the two color difference signal data R-Y and B-Y. According to the operation as noted above, the low-band converted chrominance signal during both of recording and reproduction is digitally demodulated into the two color difference signals, which are used as the color differnece signal data to compute the amplitude of the burst. As the color difference signal data to compute the amplitude of the burst, the color difference signal data (R-Y)' and (B-Y)', after being passed through the digital comb line filters 52 and 53, are used. This is because it is desirable to use the circuit both during recording and reproduction and it is configured such that the color difference signal data R-Y and B-Y are passed through the digital comb filters 52 and 53 also during recording, but it is not particularly necessary to pass the color difference signal data through the filters if the low-band converted chrominance signal does not contain the crosstalk components. The color difference signal data (R-Y)' and (B-Y)' after being passed through the digital comb filters 52 and 53 have the (R-Y)' and (B-Y)' portions of the burst section extracted during both recording and reproduction by the burst gate 73, and are supplied to the detector 33. The ACC detector (ACC DET) 74 can be considered as a circuit configured with a digital arithmetic circuit and D/A converter. If, for example, the carrier chrominance signal of an NTSC system is converted to the low-band, as shown in the vector diagram of FIG. 6, the vector B of the low-band converted burst turns into the vector with a - (opposite) direction with respect to the B-Y axis of the color difference signal demodulation axis. The result of the peak level detection by the ACC detector 71 in the embodiment of FIG. 9 is equal in magnitude to the vector B. As in the first method, the data (B-Y)' after being passed through the comb filter 52, is pulled out at the burst gate, and it is possible to turn the absolute value of such data into the peak level detection result after D/A conversion. As the second method, if any deviation occurs in the 4 fc clock supplied by the A/D converter 50 and decoder 51 due to a delay in response, such as that of the frequency and phase control of the signal generator 59 or the signal generator 21, the burst as shown in B' of FIG. 6 causes a deviation by an angle Θ with respect to the proper vector, and the magnitude of the vector B' may not be obtained. In order to prevent such a condition, because B'b and B'a of the burst data R-Y and B-Y in FIG. 6 turn respectively into the following:

$$B'b = |B'| \cos\Theta$$
$$B'a = |B'| \sin\Theta$$

$$\text{Then, } B' = \sqrt{(B'b)^2 + (B'a)^2}$$
$$= \sqrt{(B-Y)'^2 + (R-Y)'^2}$$

can be computed digitally from the demodulated data (R-Y)' and (B-Y)' after being passed through the digital comb filters 52 and 53. The result of such an operation may be D/A converted so as to use it as the result of the peak level detection. Now as the third method, a predetermined value is given for controlling the first level on the detector 74. The predetermined value is defined, for example, as BC, and the detector 74, is so configured as to output "H" of the digital data when B'≦BC and "L" of the digital data when B'>BC. Such outputs are smoothed by the lowpass filter (LPF) 75 so as to be supplied to the ACC amplifier as the control signal. In this way, it is possible to control the burst level so that the magnitude of such a burst level is in the vicinity of BC of the digital data set by the detector 74. For the method to obtain the burst level B', a method wherein the data of the greatest value selected from among the data obtained in the burst section is used as the data B' or a method which averages the data in the burst section to obtain the data of B' is possible.

FIGS. 8(c)-8(d) show the vector of the low-band converted chrominance signal when the carrier chrominance signal of a PAL system is converted to the low-band. R-Y axis is inverted every one H, and the vector of the burst is different from that of an NTSC system. The vector in this case is one generated by adding the vector in the R-Y axis of the demodulation axis and the vector in the - (opposite) direction to the B-Y axis, by 1 to 1. However, when the carrier chrominance signal of the PAL system is converted to the low-band, the burst level of the low-band converted chrominance signal is also obtained in the same way as that of the NTSC system by $$B' = \sqrt{(B'b)^2 + (B'a)^2}$$
$$= \sqrt{(B-Y)'^2 + (R-Y)'^2}$$

and the detector 74 can be realized by the same configuration as the second and third methods of the NTSC system.

As is apparent from the above noted explanation, this embodiment comprises: a switch which takes in the low-band converted chrominance signal to be recorded during recording and takes in during reproduction the low-band converted chrominance signal reproduced from the magnetic tape; the detector which detects the level of the burst section of the taken-in low-band converted chrominance signal for converting it into the control signal; and the variable gain amplifier which is capable of changing the amplification ratio or the attenuation ratio of the input signal in accordance with the controls signal. The burst level of the recorded low-band converted chrominance signal or the reproduced carrier chrominance signal is controlled so as to be constant. It is possible to use the low-band conveersion frequency to detect the peak level of the burst which was conventionally detected by the color subcarrier frequency of a high frequency. Thus, power consumption in the circuit can be reduced by the low speed circuit operation to thereby realize the circuit as a low speed digital circuit which can be adapted to integration by MOS ICs.

Furthermore, the detector may have a digital demodulator which samples and A/D converts the low-band converted chrominance signal at the quadrupled frequency of the low-band converted chrominance signal synchronized with the low-band converted carrier, and digitally demodulates the A/D converted data into two color difference signals. From the demodulated two color difference signals in detected the burst level of the low-band converted chrominance signal. Then, the control data or the control signal corresponding to the burst level is produced. The amplification ratio or the attenuation ratio of the variable gain amplifier is controlled by the controlled data or the control signal, By this configuration, the detection circuit can be digitaized and various burst level detection methods which are difficult by the conventional analog circuit are made possible, and the detection circuit that fits the low-band converted chrominance signal to be processed can be provided. It is also possible to set within the detection circuit the digital data of the burst level to perform the ACC operation, whereby the drift of the burst level due to the temperature change in the environment can be reduced. In addition, when detecting the peak level of the burst with the conventional analog process, the level of the burst responds to the level variation in the decreasing direction of the burst level, which makes it difficult to increase the time constant during holding. But according to the present invention, the level of the burst is detected at every one horizontal period, and the signal for the gain control of the variable gain amplifier is produced based on the result of the burst level detection. Therefore, the response is quick to the level variation of the converted chrominance signal, and the digital data is held so that the detection result of one horizontal interval is held as is to thereby suppress the ripple in one horizontal period.

Furthermore, as the frequency conversion method to convert during reproduction the low-band converted chrominance signal into the carrier chrominance signal of a specified carrier-frequency, the low-band converted chrominance signal is first digitally demodulated into the two color difference signals and the two color difference signals are converted into the carrier chrominance signal of a specified carrier-frequency. Thus, the decoder for the frequency conversion method for digital demodulation of the low-band converted chrominance signal into two color difference signals is used also as the demodulator of the detection circuit, and the decoder can be operated during recording. This makes it possible to perform the ACC operation without adding another demodulator, thereby simplifying the circuit. Furthermore, it is possible to set the digital data of the burst level for the ACC operation within the detection circuit, so as to thereby control the level of the chrominance signal so that the digital value of the burst level converted in the A/D converter is constant. Thus, the low-band converted chrominance signal of the signal level corresponding to the dynamic range of the A/D converter can be supplied to A/D converter. Accordingly, the signal cannot be deteriorated by the saturated A/D converted data which exceeded the dynamic range of the A/D converter because of the excessive level of the low-band converted chrominance signal or by the increased ratio of the quantized noise for the data of the original signal after A/D conversion because of the small level of the low-band converted chrominance signal, and the A/D converter can be used with the optimum signal level.

Two other embodiments will now be explained regarding the burst detection for the color killer operation with the low-band converted chrominance signal.

Figure 11:
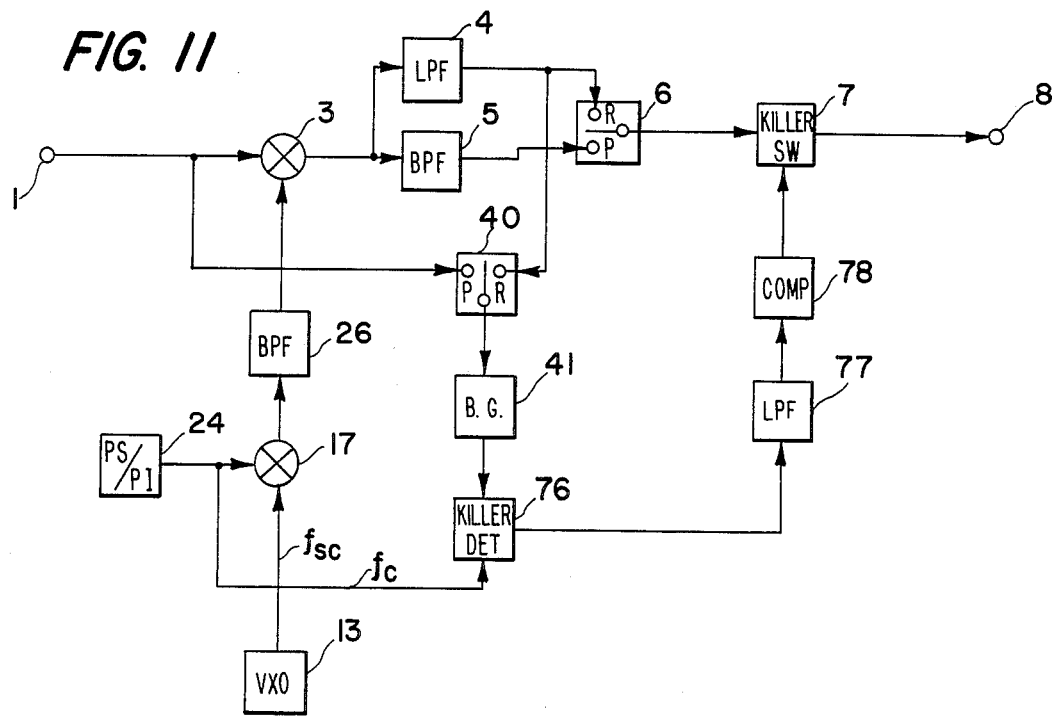
FIG. 11 is a block diagram of an embodiment of the present invention used to perform the color killer operation.

FIG. 11 is a block diagram of the chrominance signal processing apparatus in an embodiment wherein the burst detection for the color killer operation is carried out with the low-band converted chrominance signal. In the figure, the input terminal 1, signal generator 13, carrier generating circuit 24, frequency converter 17, bandpass filter 26, frequency converter 3, lowpass filter 4, switch 8, killer switch 7, terminal 8, and bandpass filter 5 perform the same operations as those of the conventional example shown in FIG. 1 or the embodiment shown in FIG. 2. As to the detection of the present of the chrominance signal, first, by the switch 40 during recording, the low-band converted chrominance signal after being passed through the lowpass filter 4 is taken in, and, during reproduction, the low-band converted chrominance signal reproduced from the magnetic tape is taken in from the input terminal 1. The taken-in carrier chrominance signal has only its burst portion extracted by the burst gate 41. The extracted burst is peak level detected or synchronously detected with the low-band converted carrier of the frequency fc from the carrier generating circuit 24 by the killer detector (KILLER DET) 76. The detection result is passed through the lowpass filter (LPF) 77 to be compared with the reference voltage by the comparator (COMP) 78, and the result controls the killer switch 7 as the result of a judgment as to the presence of a burst.

As above, according to this embodiment, the presence of the chrominance signal is detected with the low-band converted chrominance signal during both recording and reproduction, and the color killer operation is performed based on the result of such a detection.

Figure 12:
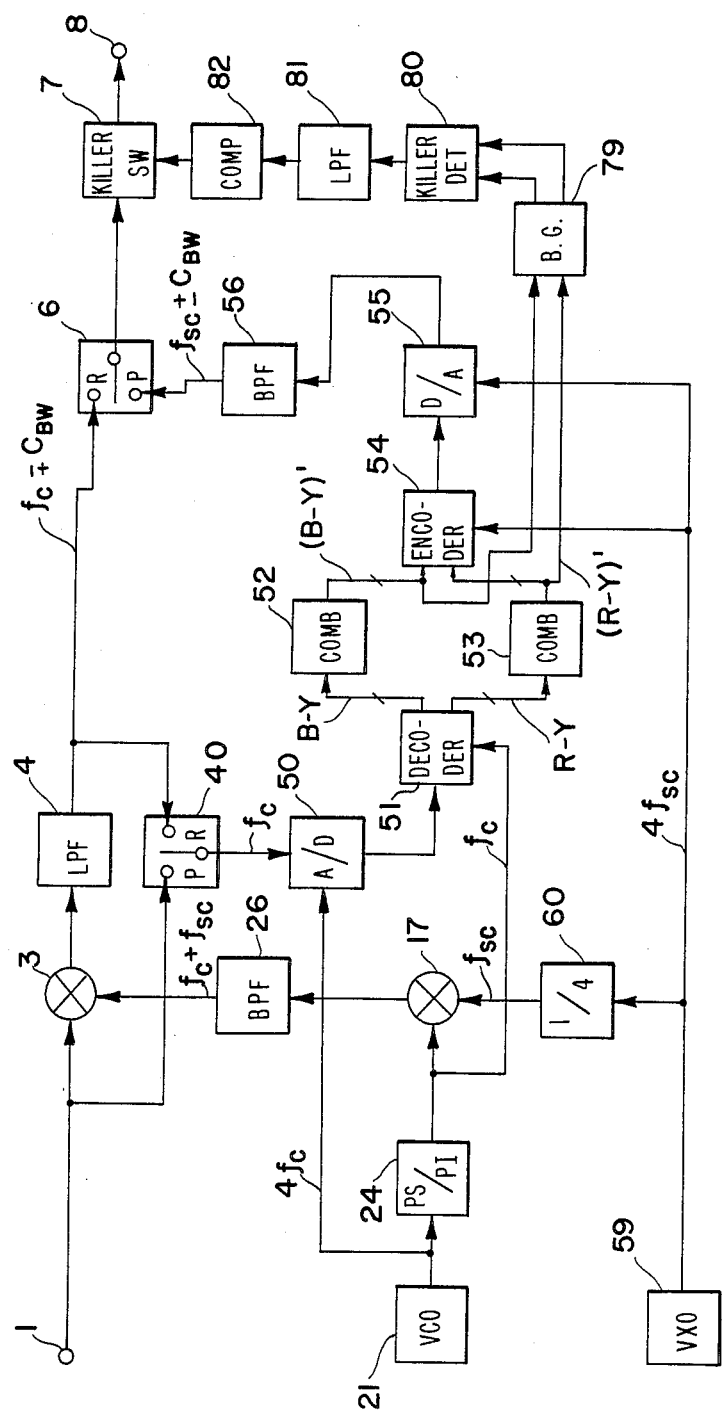
FIG. 12 is a block diagram of another embodiment of the present invention in which the color killer operation is performed by digital circuits.

Now, another embodiment will be explained regarding the detection of the burst for the color killer operation carried out with the low-band converted chrominance signal. FIG. 12 is a block diagram of the chrominance signal processing apparatus in this embodiment.

The carrier chrominance signal inputted from the input terminal 1 during recording is converted into the low-band converted chrominance signal of the carrier-frequency fc by the same method as the conventional example or as the embodiment of FIG. 11, and the recording low-band converted chrominance signal is outputted at the terminal 8.

As in the case of the embodiment shown in FIG. 3, the signal generator 59 generates the signal of the frequency 4 f sc which is four times that of the color subcarrier frequency f sc. The f sc signal is divided by the divider 60 to produce the color subcarrier of the frequency f sc. The signal generator 59 has its frequency and phase controlled so that the color subcarrier of the frequency f sc produced by the divider 60 is synchronized with the burst of the carrier chrominance signal inputted from the input terminal 1.

In other words, the signal generator 59 and the divider 60 perform the operation of the signal generator 13 of the conventional example or the FIG. 11 embodiment. Furthermore, the signal generator 21 multiples the horizontal synchronous signal of the color television signal to be recorded and when, for example, recording the color television signal of the NTSC system by the VHS recording system, the horizontal synchronous signal has its frequency increased by 160 times, that is to say, multiplied by four times the low-band converted frequency, and is supplied to the carrier generating circuit 24 which performs the division and phase shift at every one horizontal interval or process of the phase inversion. The carrier generating circuit 24 performs the processes such as those above so as to thereby produce the low-band converted carrier of the frequency fc, and supply it to the frequency converter 17.

There also is the same as the conventional example of FIG. 1 or the embodiment of FIG. 11.

The difference from the conventional example or the FIG. 11 embodiment during reproduction, is that the frequency converters 17 and 3 are not used and the reproduced low-band converted chrominance signal inputted from the input terminal 1 is supplied to the A/D converter (A/D) 50 by means of the switch 40. The conversion clock of the A/D converter 50 employs the signal of the frequency 4 fc from the signal generator 21, in the same way as the embodiment of FIG. 3. The frequency of the generated signal of the signal generator 21 is controlled so that the low-band converted carrier obtained by the carrier generating circuit 24 has its frequency and phase synchronized with the burst of the reproduced low-band converted chrominance signal inputted from the terminal 1. The reproduced low-band converted chrominance signal sampled and A/D converted by the A/D converter turns into the repeated data of B-Y, R-Y, -(B-Y), and -(R-Y) of the components of the color difference signal. The decoder 51, digital comb filters 52 and 53, encoder 54, D/A converter 55, and bandpass filter 56 can also be considered as performing quite the same operations of those of the embodiment of FIG. 3.

As to the detection method of the presence of the chrominance signal, the chrominance signal is detected from the burst portion of the demodulated color difference signal, and its operation will hereafter be described.

In the first place, during recording, the recording low-band converted chrominance signal is supplied, after being passed through the lowpass filter 4, through the switch 40 to the A/D converter 50 which is used as a part of the demodulator for frequency conversion during reproduction. During recording, the signal generator 21 is controlled as described above to generate the signal which is an integral multiple of the horizontal synchronous frequency and four times the low-band converted carrier frequency f sc. Furthermore, the recording low-band converted chrominance signal is controlled by changing the frequency 4 f sc of the signal generated by the signal generator 59 so that the carrier of the recording low-band converted chrominance signal is synchronized with the low-band converted carrier produced by the carrier generating circuit 24. For this reason, it is possible to demodulate the low-band converted chrominance signal into the two color difference signals, R-Y and B-Y by the A/D converter 50 and decoder 51. For reproduction, as explained above, the reproduction low-band converted chrominance signal is configured for frequency conversion and demodulated once into the two color difference signals, R-Y and B-Y. As the color difference signal data for detection of the presence of the chrominance signal, the color difference signal data (R-Y)' and (B-Y)' after having passed through the digital comb filters 52 and 53 are used.

This is because it is desirable for the circuit to be used both during recording and reproduction, but it is not particularly necessary to pass the color difference signal through the filters if the low-band converted chrominance signal does not contain crosstalk components. The color difference data (R-Y)' and (B-Y)' after being passed through the digital comb filters 52 and 53 have only the data (R-Y)' and (B-Y)' of the burst section extracted during both of recording and reproduction by the burst gate (BG) 79, and are supplied to the killer detector (KILLER DET) 80. The detector 80 can be considered as the circuit configured with a digital arithmetic circuit and a D/A converter. When, for example, the operation of the synchronous detection of the burst is desired, B-Y data of the color difference signal data of the burst section can be considered the value which is synchronously and digitally detected. The (B-Y)' data of the burst portion may be D/A converted as is, or the greatest one of the (B-Y)' data may be D/A converted at every one horizontal interval, or the whole (B-Y)' data of the burst portion may be added at every one horizontal interval and D/A converted.

When detecting the peak level of the burst, from (B-Y)' data and (R-Y)' data $\sqrt{\{(B-Y)'\}^2+\{(B-Y)\}^2}$ is obtained digitally, and the result can be considered the value detected of the peak level. In the same way as the synchronous detection, various methods can be used to make data to be finally D/A converted. The result of the detection is D/A converted by the detector 80, and passes through the lowpass filter (LPF) 81 to be compared with the reference voltage by the comparator (COMP) 82. The killer switch 7 is controlled with the result of the comparison as being the result of a judgment as to the presence of the chrominance signal. As described above, the presence of the chrominance signal is detected during both recording and reproduction by digitally demodulating the low-band converted chrominance signal into the color difference signal, and the color killer operation is carried out based on the result of such a detection.

As is apparent from the above explanation, the present invention provides: the switch which takes in the low-band converted chrominance signal to be recorded during recording and takes in the low-band converted chrominance signal reproduced from the magnetic tape during reproduction; the killer detector which detects the level of the burst portion of the taken-in low-band converted chrominance signal or performs the synchronous detection by the low-band converted carrier produced for the frequency conversion of the burst portion; the comparator which determines whether to supply to the output terminal the reproduced carrier chrominance signal or the recorded low-band converted chrominance signal based on the result obtained by the killer detection circuit; and the killer switch which controls whether to supply to the output terminal the reproduced carrier chrominance signal or the low-band converted chrominance signal according to the result of the judgement of the comparator. The presence of the chrominance signal is detected and the reproduced carrier chrominance signal or the recorded low-band converted chrominance signal is supplied to the output terminal when the chrominance signal is present. The output terminal is caused to be released or to be in the signal-less state (hereafter referred to as muting), whereby it is possible to perform the detection with the reduced low-band converted frequency fc instead of the burst detection which was conventionally carried out by the color subcarrier frequency f sc. When performing the synchronous detection with the conventional high frequency, it is difficult to cause the detection is the phases of the carrier for detection and the signal to be detected are deviated by the wiring of the circuits or by the delayed signal caused by the circuit elements. The low speed circuit operation can be realized when detecting the peak level or when performing the synchronous detection, whereby the detecting accuracy is improved, power consumption tis reduced, digitization at a low speed is made possible, which is adaptable to integration by MOS LSIs.

Furthermore, the killer detector is provided with an A/D converter which performs sampling and A/D conversion of the low-band converted chrominance signal by the quadrupled frequency of the low-band converted carrier and the clock synchronized in phase with the burst of the low-band converted chrominance signal, and a demodulator configured with a decoder which demodulates the digital data converted by the A/D converter into two color difference signals, so that the B-Y data of the color difference signal is used as an output of the synchronous detection or the R-Y data and B-Y data of the color difference signal are operated upon so as to be used as the results of the burst level detection. With such a configuration, the killer detector is digitized and the R-Y data and B-Y data of the color difference signal data are operated upon. Both the peak level detection and the synchronous detection are made possible utilizing characteristics of both elements. Thus, it is possible to prevent malfunctions caused by noise and malfunctions caused by the delayed leading in of the frequency control in the frequency conversion system which have been the problems of the peak level detection and synchronous detection respectively.

By further providing the digital data operation, it becomes possible to provide the non-linearity with processes and detection characteristics of differentiation and integration to thereby increase the degree of freedom of the characteristics of the killer detector, and the killer detector which fits the characteristics of the apparatus can be provided.

Furthermore, as a method of frequency conversion to convert during reproduction the low-band converted chrominance signal into the carrier chrominance signal of a specified carrier-frequency, the low-band converted chrominance signal is demodulated into two digital data portions of the color difference signal, and the color difference signal data are converted into the carrier chrominance signal of a specified carrier-frequency, so that the demodulator of the killer detector is also used as the demodulator for frequency conversion which demodulates the low-band converted chrominance signal into two digital data portions of the color difference signal. In such a configuration, it is possible to perform the killer operation, and the device can be simplified without adding another demodulator for killer detection.

Figure 13:
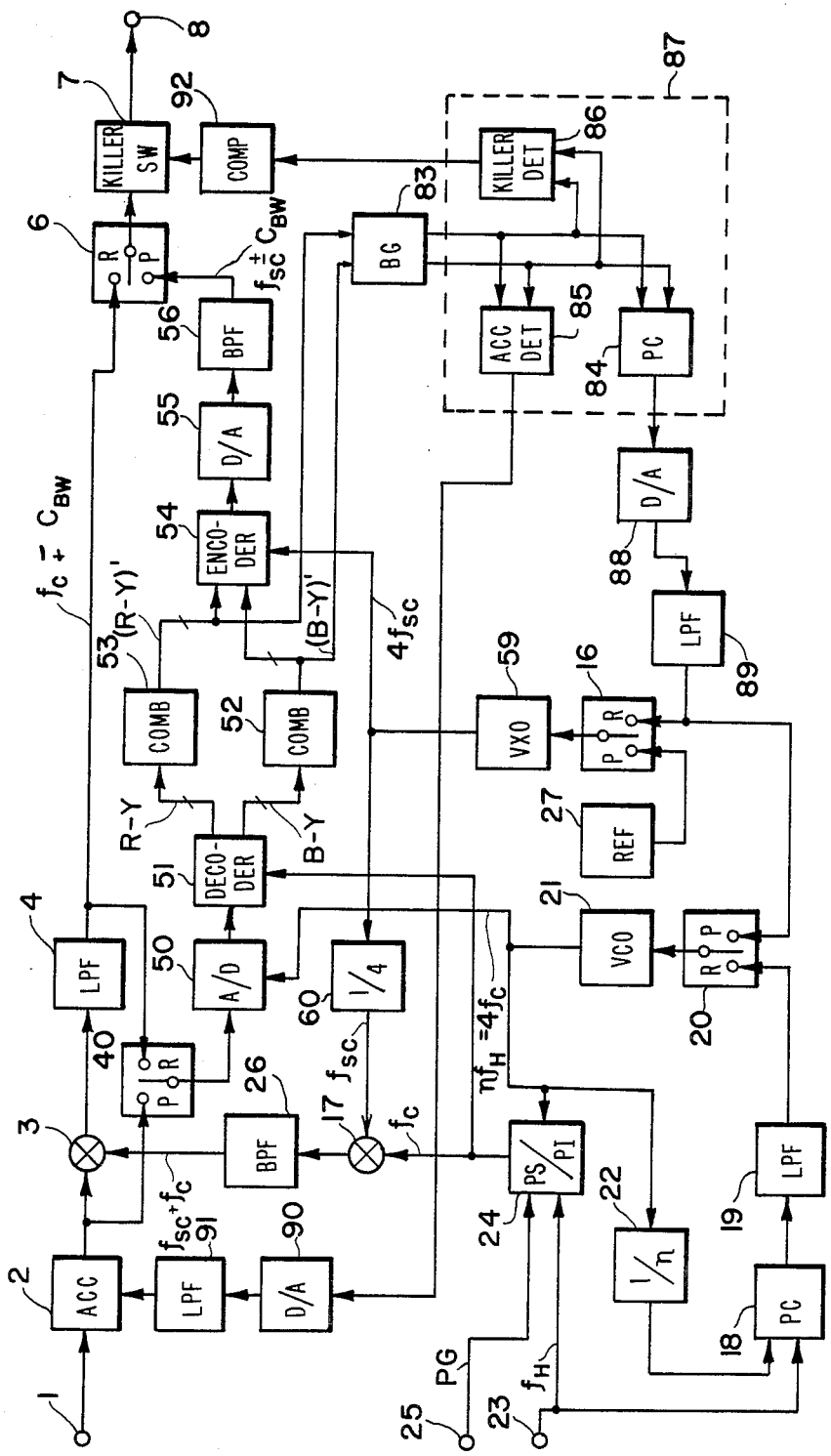
FIG. 13 is a block diagram of a further embodiment of the present invention in which a demodulating circuit for demodulating the low-band converted chrominance signal into two color difference signals is used in part in common with a detection circuit of the low-band converted burst for APC, ACC and color killer operations.

Now, another embodiment will be described wherein a part of the demodulator used to demodulate the low-band converted chrominance signal into two color difference signals is also used as the detector of the low-band converted burst for the APC operation, ACC operation and color killer operation. FIG. 13 is a block diagram of the chrominance signal processing apparatus of such an embodiment.

In the same way as that of the embodiment of FIG. 3, the carrier chrominance signal of the carrier-frequency f sc is supplied during recording from the terminal 1, and level adjusted by the ACC amplifier 2. The low-band converted chrominance signal is produced at the terminal 8 by means of the frequency converter 3, lowpass filter 4, switch 6, and killer switch 7. During reproduction, the low-band converted chrominance signal after having passed through the ACC amplifier 2 is sampled and A/D converted by the A/D converter 50 by the clock which is synchronized with the carrier of the low-band converted chrominance signal by means of the switch 40, said clock being an integral multiple thereof in frequency and further demodulated digitally into two digital data portions, R-Y and B-Y, of the color difference signal by the decoder 51. Here, the A/D converter 50 is caused to operate at the frequency 4 f sc which is four times that of the low-band converted carrier. The phase of the clock is controlled so that the A/D converted data will be the repeated digital data of B-Y, R-Y, -(B-Y), and -(R-Y) of the color difference signal. This digital data is processed with code inversion and separation by the decoder 51, so that two color difference digital signals are obtained. The two color difference digital signals are added to the data before one horizontal interval (or before two horizontal intervals in the case of the color television signal of the PAL system) by the digital comb filters 52 and 53, so that two color difference signal digital data portions (R-Y)' and (B-Y)' are obtained which have had the higher harmonics of crosstalk removed. The two color difference signal digital data thus obtained are now code inverted by the encoder 54, outputted repeatedly in order of (R-Y)', (B-Y)', -(R-Y), and -(B-Y) by the clock of the frequency 4 f sc which is quadruple that of the reference carrier frequency f sc, converted into an analog signal by the D/A converter, and has an unnecessary component of its frequency removed by the bandpass filter 56, whereby the carrier chrominance signal of the carrier-frequency f sc is obtained. The obtained carrier chrominance signal is outputted at the terminal 8 by means of the switch 6 and the killer switch 7, which process is the same as that of the embodiment of FIG. 3.

To obtain the burst information necessary for the ACC operation, APC operation, and killer operation supply, during recording, the low-band converted chrominance signal, after having passed through the lowpass filter 4, is supplied to the A/D converter by the switch 40, converted into two color difference signal digital data, (R-Y)' and (B-Y)' in the same manner as during reproduction. The digital data of the burst portion of the color difference signal digital data (R-Y)'. (B-Y)' are obtained during both recording and reproduction by extraction by the burst gate (BG).

In the case of the ACC opertion, when demodulation is accurately performed, if the color difference signal data of the burst portion is the record of the color television signal of the NTSC system, (B-Y)' data is provided with a negative value of a certain magnitude, and the absolute value of (B-Y)' data is equivalent to the result of the peak level detection and is the data of the burst level. When the demodulation is not performed accurately or in case (B-Y)' has a negative value of certain magnitude as the color television signal of the PAL system and (R-Y)' has the constant magnitude with the positive code and negative code changing at one horizotnal interval, the data of the burst level is obtained from $\sqrt{(R-Y)'^2+(B-Y)'^2}$. The data of the burst level as described above is obtained in terms of the digital data from the ACC detector (ACC DET) 85, and converted into the analog values by the D/A converter (D/A) 90. The chrominance signal level is controlled at a constant level by feeding back to the ACC amplifier 2 by means of the lowpass filter (LPF) 91. The ACC detector 85 has internally, in addition to the above elements, a reference level to be level controlled as the digital data. The digital data of the burst level obtained as above is compared with the digital data of the reference level. The digital data equivalent to its difference is supplied to the D/A converter 90, and, for example, the D/A converter 90 of current output type may be configured to obtain the control signal for the ACC amplifier after integrating through the lowpass filter 91.

Considering the response speed and safety of the ACC operation, the process may be employed to provide the non-linearity with the digital data to be sent to the D/A converter 90. Further, by averaging the color difference signal data of the burst section or the data of the burst level by the ACC detector 85, malfunctions due to noise contained in the low-band converted chrominance signal are reduced.

As to the APC operation, by judging whether the two color difference signal digital data (R-Y)' and (B-Y)' of the burst portion removed by the burst gate 40 during both recording and reproduction are accurately demodulated, the value corresponding to the phase error is supplied as digital data to the D/A converter (D/A) 88 by the phase error detector (PC) 84. The phase error converted into an analog value is passed through the lowpass filter (LPF) 89 to obtain the control voltage for frequency and phase control of the carrier during recording and reproduction. For example, when recording and reproducing the color television signal of the NTSC system, only the (B-Y)' digital data is present at the burst portion. Therefore the (R-Y)' digital data as is may be supplied to the D/A converter 89 as the phase error. If the digital data of an angle Θ expressed by tan Θ=(R-Y)'/(B-Y)' is obtained with respect to the data (R-Y)' and (B-Y)', the angle Θ is the phase error. Also, because the data (R-Y)' inverts at every one horizontal interval in the case of the color television signal of the PAL system, adding the data (R-Y)' and (B-Y)' to the data before one horizontal interval cancels the components of (B-Y)' and (R-Y)' and can be handled in the same manner as the data of the NTSC system.

In the same way as the ACC operation, the digital data to be sent from the phase error detector 84 to the D/A converter 45 may be provided with the non-linearity in consideration of the response speed and safety of the APC operation and with the function to obtain the average of the color difference signal data in the burst section or the average of the phase error, to thereby reduce malfunctions caused by noise. In the method whereby the APC operation is carried out by the control voltage for the frequency and phase control as explained above, the signal generator 59 which oscillates at the frequency 4 f sc to cause the encoder 54 to operate during reproduction is caused to operate as the voltage control oscillator during recording. In other words, the control voltage after being passed through the lowpass filter 89 is supplied to the signal generator 59 by means of the switch 16. The signal of the frequency 4 f sc consequentially obtained is divided by the divider 49 to obtain the signal of the frequency f sc, and multiplied by the low-band converted chrominance signal of the frequency fc by the frequency converter 17. The signal of the frequency f sc+fc is extracted by the bandpass filter 26 and supplied to the frequency converter 3, and the low-band converted carrier of the low-band converted chrominance signal taken out finally from the terminal 8 is controlled so as to be synchronized with the low-band converted carrier to be supplied to the frequency converter 17. The low-band converted carrier of the frequency fc supplied to the frequency converter 17 is multiplied by n times the frequency fH of the horizontal synchronous signal inputted from the terminal 23 by the PLL consisting of the phase comparator 18, lowpass filter 19, switch 20, signal generator 21, and divider 22 as in the conventional example of FIG. 1. The 4 fc=nfH which is four times the low-band converted frequency is produced, divided by the carrier generating circuit 24 and produced by processing with PS or PI by the horizontal synchronous signal and the track discriminating signal PG inputted from the terminal 25. The signal of the frequency 4 fc is supplied to the A/D converter as a clock. The low-band converted carrier of the frequency fc is supplied to the decoder 51, and is used as the signal to demodulate the low-band converted chrominance signal into two color difference signal digital data during both recording and reproduction. During reproduction, the demodulated two color difference signal digital data (R-Y)' and (B-Y)' are converted into the carrier chrominance signal of the reference carrier-frequency f sc. The constant voltage from the reference voltage source 27 is turned into the control input by means of the switch 16. The signal generator 59 generates the signal of the reference frequency 4 f sc and supplies it to the encoder 54. Of the APC operation, the control voltage after being passed through the lowpass filter 89 is supplied to the signal generator 21 by means of the switch 20. The clock of the frequency 4 fc supplied to the A/D converter and the signal of the frequency fc supplied to the decoder 51 are controlled in frequency and phase, whereby the low-band converted carrier produced by the carrier generating circuit 24 is operated so as to be synchronized with the burst of the low-band converted chrominance signal after finally being passed through the ACC amplifier, and the accurately demodulated two color difference signal digital data (R-Y)' and (B-Y)' are obtained.

Concerning the killer operation, it is necessary to obtain the signal corresponding to the output of the synchronous detection and this is nothing but the value of which the B-Y data code of the burst portion is inverted. For example, the data code of the burst portion (B-Y)' is inverted by the killer detector (KILLER DET) 86 to provide a boundary to determine whether the internally set killer operation is to be carried out; discrimination and counting are conducted at every one horizontal interval to supply the results of the counting to the comparator (COMP) 92. If the comparator 92 provides, as a result of the counting, the value which, for example, is lower than the boundary for five continuous horizontal intervals, the color killer is operated. If the value which is higher than the boundary for five continuous horizontal intervals is given, the killer switch 7 is controlled so as to release the color killer. The entire operation can be conducted by the digital circuit. The data (B-Y)' may be D/A converted as is after being passed through the lowpass filter in the same manner as that of the embodiment of FIG. 12, and it may be possible to determine whether to operate the color killer by the analog comparator. As has been explained, in the present invention, the data to carry out the ACC operation, APC operation, and color killer operation are taken in from the two color difference signal digital data, the ACC detector 85, phase error detector 84, killer detector 86 for major detecting operation and main parts of circuits are digitized, the operation common to said each circuit such as the one to average the color differnce signal data of the burst portion is used in common in one circuit, and it is possible to configure them as one digital circuit 87. The operation carried out by three analog detectors in the conventional example of FIG. 1 are partially used in common for the three detectors and digitized by demodulating the two color difference signal digital data of the burst portion by the A/D converter 50 and decoder 51.

An embodiment according to the present invention is explained wherein a part of the demodulator to demodulate the low-band converted chrominance signal into two color difference signals is used in common with the detector of the low-band converted burst for the APC operation, ACC operation and color killer operation. But as long as the demodulator corresponding to the A/D converter 50 and decoder 51 is one which converts the low-band converted chrominance signal into two color difference signal digital data by the low-band converted chrominance signal and the demodulation axis which is synchronized in frequency and phase, then, it may be possible by means of other digital circuits. Also, as the frequency conversion method for reproduction, it can be made possible by the frequency conversion by the frequency converter 3 of the conventional example in FIG. 1 and by providing the digital demodulator before or after the burst gate 10 so as to supply two color difference signal digital data.

As is apparent from the above explanation, in this embodiment, the low-band converted chrominance signal is demodulated into two color difference signal digital data, the digital data of the burst portion of the digital data is operated upon, and the control signals for the ACC operation, APC operation, and color killer operation are thereby produced. All of the three necessary detectors are digitized, circuits are simplified by using common operating parts, digitized operation permits one to freely make control signals and to increase the degree of freedom in circuit design. Detection characteristics and response characteristics of each operation are improved. Characteristics matching the circuit devices to be combined or the signals to be processed can be generated, and highly integrated MOS ICs and reduced consumption power are made possible.

Furthermore, during recording, the low-band converted chrominance signal to be recorded is demodulated digitally, and, during reproduction, the low-band converted chrominance signal reproduced from the magnetic tape is demodulated digitally. During both recording and reproduction, each operation is carried out according to the data of the burst portion of the low-band converter chrominance signal which is digitally demodulated, and it is possible to use in common circuits to perform each operation during recording and reproduction.

Furthermore, as the frequency conversion method to convert, during reproduction, the low-band converted chrominance signal into a specified carrier-frequency, the low-band converted chrominance signal is demodulated into two color difference signal digital data, and the two color difference signal digital data are converted into the carrier chrominance signal of a specified carrier-frequency. Thus, it is not necessary to additionally provide the circuit to demodulate the low-band converted chrominance signal to carry out each operation, whereby circuits can be simplified.

What is claimed is:

1. A chrominance signal processing apparatus for converting a carrier chrominance signal to a low-band converted chrominance signal in a first operation mode and for converting said low-band converted chrominance signal to said carrier chrominance signal in a second operation mode, comprising:

an input terminal to which said carrier chrominance signal is inputted as an input signal in the first operation mode and said low-band converted chrominance signal is inputted as said input signal in the second operation mode;

a frequency converting circuit for converting said input carrier chrominance signal to said low-band converted chrominance signal in the first operation mode and for converting said input low-band converted chrominance signal to said carrier chrominance signal in the second operation mode;

a first carrier generating circuit for generating a first carrier signal which has a frequency substantially equal to a carrier frequency of said carrier chrominance signal, said first carrier signal being supplied to said frequency converting circuit;

a second carrier generating circuit for generating a second carrier signal which has a frequency substantially equal to a low-band converted carrier frequency of said low-band converted chrominance signal, said second carrier signal being supplied to said frequency converting circuit;

a change-over switch for selecting an output terminal of said frequency converting circuit in the first operation mode and an input terminal of said frequency converting circuit in the second operation mode for passing said low-band converted chrominance signal in each of the first and second operation modes; and a phase error detecting circuit for detecting a phase error of said input signal from said low-band converted chrominance signal from said change-over switch and for producing a control voltage signal corresponding to said phase error, said control voltage signal being supplied to one of said first and second carrier generating circuits in each of the first and second operation modes to control one of said first and second carrier generating circuits so as to compensate for said phase error.

2. A chrominance signal processing apparatus for converting a carrier chrominance signal to a low-band converted chrominance signal in a first operation mode and for converting said low-band converted chrominance signal to said carrier chrominance signal in a second operation mode, comprising:

an input terminal to which said carrier chrominance signal is inputted as an input signal in the first operation mode and said low-band converted chrominance signal is inputted as said input signal in the second operation mode;

a frequency converting circuit for converting said input carrier chrominance signal to said low-band converted chrominance signal;

a first change-over switch for selecting an output terminal of said frequency converting circuit in the first operation mode and an input terminal of said frequency converting circuit in the second operation mode for passing said low-band converted chrominance signal in each of the first and second operation modes;

a decoding circuit for decoding said low-band converted chrominance signal from said first change-over switch to obtain two chrominance difference signals;

an encoding circuit for encoding said two chrominance difference signals to obtain said carrier chrominance signal;

a second change-over switch for selectively passing to an output terminal said low-band converted chrominance signal from said frequency converting circuit in the first operation mode and said carrier chrominance signal from said encoding circuit in the second operation mode;

a first carrier generating circuit for generating a first carrier signal which has a frequency substantially equal to a carrier frequency of said carrier chrominance signal, said first carrier signal being supplied to said frequency converting circuit, and for generating a first sampling frequency signal which is supplied to said encoding circuit;

a second carrier generating circuit for generating a second carrier signal which has a frequency substantially equal to a low-band converted carrier frequency of said low-band converted chrominance signal, said second carrier signal being supplied to said frequency converting circuit, and for generating a second sampling frequency signal which is supplied to said decoding circuit; and a phase error detecting circuit for detecting a phase error of said input signal from at least one of said two chrominance difference signals and for producing a control voltage signal corresponding to said phase error, said control voltage signal being supplied to one of said first and second carrier generating circuits in each of the first and second operation modes to control one of said first and second carrier generating circuits so as to compensate for said phase error.

3. An apparatus according to claim 2,
wherein said first carrier generating circuit has a first voltage controlled oscillator which is supplied with said control voltage signal through a third change-over switch in the first operation mode so that an oscillation frequency of said first voltage controlled oscillator is controlled by said control voltage signal, said first voltage controlled oscillator being supplied with a first fixed voltage through said third change-over switch in the second operation mode, and
wherein said second carrier generating circuit has a second voltage controlled oscillator which is supplied with said control voltage signal through a fourth change-over switch in the second operation mode so that an oscillation frequency of said second voltage controlled oscillator is controlled by said control voltage signal, said second voltage controlled oscillator being supplied with a second fixed voltage through said fourth change-over switch in the first operation mode.

4. An apparatus according to claim 2,
wherein said first carrier generating circuit has a fixed frequency oscillator, and
wherein said second carrier generating circuit has a first voltage controlled oscillator which is supplied with a fixed voltage and a second voltage controlled oscillator which is controlled by said control voltage signal;
and wherein an oscillation signal of said first voltage controlled oscillator is selected by a third change-over switch for said second sampling frequency signal in the first operation mode, and wherein an oscillation signal of said second voltage controlled oscillator used is as said second carrier signal in both the first and second operation modes and is selected by said third change-over switch for said second sampling frequency signal in the second operation mode.

5. An apparatus according to claim 4, wherein said phase error detecting circuit comprises a sample and hold circuit for sampling and holding a burst section of one of said two chrominance difference signals, and an inverting circuit for inverting an output signal of said sample and hold circuit to obtain said control voltage signal.

6. An apparatus according to claim 2, wherein said decoding circuit comprises an A/D converter for converting said low-band converted chrominance signal from said first change-over switch to a digital low-band converted chrominance signal, a digital decoder for decoding said digital low-band converted chrominance signal to obtain two digital chrominance difference signals, and two digital comb filters for respectively passing said two digital chrominance difference signals;
wherein said encoding circuit further comprises a digital encoder for encoding digital output signals of said two digital comb filters to obtain a digital carrier chrominance signal, and a D/A converter for converting said digital carrier chrominance signal to said carrier chrominance signal.

7. An apparatus according to claim 6, further comprising an ACC amplifier for adjusting said input signal so as to have an adequate signal level, a color killer switch disposed between said second change-over switch and said output terminal of said apparatus for performing a color killer operation, and a circuit for producing control signals for respectively controlling said ACC amplifier and said color killer switch from said two chrominance difference signals.

* * * * *